(12) United States Patent
Lacoste et al.

(10) Patent No.: US 11,235,979 B2
(45) Date of Patent: Feb. 1, 2022

(54) METHOD FOR MANUFACTURING CRYSTALS OF ALUMINATE OF AT LEAST ONE METAL AND/OR ONE METALLOID AND/OR ONE LANTHANIDE, AND APPLICATIONS OF SAME

(71) Applicant: EASYL, Bonneville (FR)

(72) Inventors: François Lacoste, Neuilly sur Seine (FR); Valentin Lair, Chaumont (FR); Julien Thiel, Arbusigny (FR); Samy Halloumi, La Roche sur Foron (FR)

(73) Assignee: EASYL, Bonneville (FR)

( * ) Notice: Subject to any disclaimer, the term of this patent is extended or adjusted under 35 U.S.C. 154(b) by 362 days.

(21) Appl. No.: 16/339,886

(22) PCT Filed: Oct. 5, 2017

(86) PCT No.: PCT/FR2017/052737
§ 371 (c)(1),
(2) Date: Apr. 5, 2019

(87) PCT Pub. No.: WO2018/065736
PCT Pub. Date: Apr. 12, 2018

(65) Prior Publication Data
US 2019/0263672 A1    Aug. 29, 2019

(30) Foreign Application Priority Data
Oct. 5, 2016  (FR) ...................... 1659627

(51) Int. Cl.
*C01F 7/16* (2006.01)
*B01J 23/02* (2006.01)
(Continued)

(52) U.S. Cl.
CPC ............. *C01F 7/162* (2013.01); *B01J 23/005* (2013.01); *B01J 23/02* (2013.01); *B01J 23/06* (2013.01);
(Continued)

(58) Field of Classification Search
CPC ............ C01F 7/162; C01F 7/16; C01F 7/164; C01F 7/166; C01F 7/168; B01J 23/005;
(Continued)

(56) References Cited

PUBLICATIONS

International Search Report, PCT/FR2017/052737, dated Nov. 28, 2017.
(Continued)

*Primary Examiner* — James A Fiorito
(74) *Attorney, Agent, or Firm* — Nixon & Vanderhye

(57) ABSTRACT

Disclosed is a method for manufacturing crystals of aluminates of one or more element(s) other than aluminium, referred to as "A. The method includes: placing starting reagents, including at least one aluminium element source and a source of the element(s) A that has a degree of oxidation of between 1 and 6, in suspension in a liquid medium, forming a suspension referred to as the "starting suspension"; milling the starting suspension at ≤50° C., in a three-dimensional liquid medium ball mill for ≤5 minutes; recovering, at the outlet of the three-dimensional ball mill, a suspension referred to as the "end suspension" including the starting reagents in activated form or crystals of aluminate of the element(s) A generally in hydrated form; if required, calcination of the end suspension when it includes the starting reagents in activated form, to obtain generally non-hydrated crystals of aluminate of the element(s) A.

21 Claims, 4 Drawing Sheets

(51) Int. Cl.
| | |
|---|---|
| *B01J 23/06* | (2006.01) |
| *B01J 35/00* | (2006.01) |
| *B01J 35/08* | (2006.01) |
| *B01J 37/00* | (2006.01) |
| *B01J 37/08* | (2006.01) |
| *C01G 9/00* | (2006.01) |
| *C09K 11/64* | (2006.01) |
| *B01J 23/00* | (2006.01) |
| *C09K 11/77* | (2006.01) |
| *C09K 11/59* | (2006.01) |
| *C09K 11/08* | (2006.01) |
| *B01J 21/02* | (2006.01) |

(52) U.S. Cl.
CPC ......... *B01J 35/004* (2013.01); *B01J 35/0026* (2013.01); *B01J 35/08* (2013.01); *B01J 37/0036* (2013.01); *B01J 37/0045* (2013.01); *B01J 37/08* (2013.01); *C01F 7/16* (2013.01); *C01F 7/164* (2013.01); *C01F 7/166* (2013.01); *C01F 7/168* (2013.01); *C01G 9/00* (2013.01); *C01G 9/006* (2013.01); *C09K 11/0838* (2013.01); *C09K 11/592* (2013.01); *C09K 11/641* (2013.01); *C09K 11/643* (2013.01); *C09K 11/7706* (2013.01); *C09K 11/7715* (2013.01); *B01J 21/02* (2013.01); *C01P 2002/72* (2013.01); *C01P 2004/32* (2013.01); *C01P 2004/61* (2013.01); *C01P 2004/62* (2013.01); *C01P 2004/64* (2013.01); *C01P 2006/10* (2013.01)

(58) Field of Classification Search
CPC ........ B01J 23/02; B01J 23/06; B01J 35/0026; B01J 35/004; B01J 35/08; B01J 37/0036; B01J 37/0045; B01J 37/08; C01G 9/00; C01G 9/006; C09K 11/0838; C09K 11/592; C09K 11/641; C09K 11/643; C09K 11/7706; C09K 11/7715

See application file for complete search history.

(56) References Cited

PUBLICATIONS

Rivas Mercury et al: "Synthesis of $CaAl_2O_4$ from powders: Particle size effect", Journal of The European Ceramic Soci, Elsevier Science Publishers, Barking, Essex, GB, vol. 25, No. 14, Sep. 1, 2005 (Sep. 1, 2005), pp. 3269-3279, XP005001233, ISSN: 0955-2219, 001: 10.1016/J.JEURCERAMSOC.2004.06.021 cited in the application pp. 3269-3270 "2. Experimental Procedure" p. 3279 "5. Conclusion".

Driana D Ballarini et al: "Characterization of ZnAl 2 0 4 Obtained by Different Methods and Used as Catalytic Support of Pt", Catalysis Letters, Kluwer Academic Publishers—Plenum Publishers, NE, vol. 129, No. 3-4, Jan. 17, 2009 (Jan. 17, 2009), pp. 293-302, XP019672081, ISSN: 1572-879X cited in the application p. 294 "2.1 Preparation of ZnAl 2 O 4" p. 294 "2.2 Preparation of the Catalyst".

Bocanegra S A et al: "The influence of the synthesis routes of MgAl 2 O 4 on its properties and behavior as support of dehydrogenation catalysts", Materials Chemistry and Physics. Elsevier SA. Switzerland. Taiwan. Republic of China. vol. 111. No. 2-3. Oct. 15, 2008 (Oct. 15, 2008). pp. 534-541. XP023180209. ISSN: 0254-0584. DOI: 10.1016/J.MATCHEMPHYS.2008.05.002 [retrieved on Jun. 17, 2008] cited in the application abstract p. 535 "2.2 Mechanochemical synthesis of MgAl 2 O 4".

METHOD FOR MANUFACTURING CRYSTALS OF ALUMINATE OF AT LEAST ONE METAL AND/OR ONE METALLOID AND/OR ONE LANTHANIDE, AND APPLICATIONS OF SAME

TECHNICAL FIELD TO WHICH THE INVENTION RELATES

The present invention relates to a method for manufacturing crystals of aluminate of at least one metal and/or one metalloid and/or one lanthanide.

In particular, the present invention relates to a method for manufacturing crystals of these various aluminates implementing in particular a step of micromilling in a three-dimensional microbead mill in a liquid medium (generally water) carried out in a very short time and without any special heating. This micromilling step also facilitates any calcination step that may be carried out subsequently.

The crystals obtained according to the aforementioned method may be used for manufacturing: materials that are luminescent in the ultraviolet range, catalysts, in particular for synthesizing biofuels, photocatalytic materials, photoluminescent materials, dielectric ceramics, or strong transparent materials.

TECHNOLOGICAL BACKGROUND

There exist in the prior art various methods for preparing homogeneous mixtures of a powder of an aluminate of at least one other chemical element, which is generally chosen from metals, metalloids or lanthanides.

A chemical approach and a mechanosynthesis approach can in particular be distinguished, these two approaches generally use, as starting reagents, an aluminium oxide and an oxide of the other chemical element, or one of the precursors thereof.

In particular, preparing aluminate crystals chemically consists first of all in preparing the starting reagents, mixing them as homogeneously as possible and calcining the mixture thus obtained so as to effect the combination reaction.

The mixing of the raw materials may be carried out dry. In this case, the imperfect homogeneity of the mixture is compensated for by a long-duration calcination, of around several hours and at high temperature (often exceeding 1200° C.) in order to give the time necessary for implementing the reaction by solid diffusion. Despite these extreme conditions, the end product is generally not completely transformed. It is then necessary to proceed with one or more supplementary calcination cycles before ending up with a sufficiently pure end product.

The mixing of the raw materials may also be carried out in a liquid medium (aqueous solution) in order, after drying, to give a more homogeneous powder that will subsequently be heated several times at high temperature, for very long times (sometimes requiring three heating steps, for a total duration of heating at more than 200° C. that may be as much as 13 hours). By way of example, the publication by I. Miron et al. "Doped zinc aluminate spinel synthesized by hydrothermal method"—Digest Journal of Nanomaterials and Biostructures—Vol 7, No 3 (2012) describes the preparation of zinc aluminate crystals from a zinc nitrate and aluminium nitrate solution.

In order to further improve the homogeneity of the mixture comprising the starting reagents, many authors use the sol-gel method. This method consists of preparing an alcohol solution, for example in isopropanol, of aluminium isopropoxide and the salt of the other chemical element and gelling it before calcination thereof. Thus S. Janakova describes, in his publication "Preparation and structural investigations of sol-gel derived Eu3+-doped $CaAl_2O_4$" that appeared in the Journal of Physics and Chemistry of Solids 65 (2007), the preparation of calcium aluminate crystals.

However, the drawbacks of these methods for preparing aluminate chemically are the cost of the raw materials, the complexity of a preparation in several steps and the gaseous pollution given off during calcination.

Another approach thus consists of preparing the crystals of aluminate of another element and in particular the aforementioned mixing step, by mechanosynthesis.

This method consists of milling, generally dry (non-liquid medium), the starting reagents in the form of powder in a bowl, made from steel or agate, with beads with a diameter generally of around 10 mm, and next carrying out a calcination step.

The work by Evvgenii Avvakumov entitled "Soft Mechano Chemical Synthesis" published in 2001 by Kluwer Academic Publishers gives examples of preparation for obtaining, by mechanosynthesis and after calcination, numerous ceramic oxides, in particular of aluminates, silicates or titanates. This method thus uses starting reagents in powder form, so as to carry out dry milling. It is in particular stated in chapter 5 of this work that it is necessary to carry out partial dehydration of the starting reagents when they are in hydrated form, such as in hydroxide form, in order to "activate" the starting mixture.

By way of example, Jadambaa Temuujin et al., in the publication "Effect of mechanochemical treatment on the synthesis of calcium dialuminate", which appeared in J. Mater. Chem (2000) Vol. 10; p. 1019-1023, describes the synthesis of calcium dialuminate, $CaAl_4O_7$, from mixtures, in stoichiometric proportion, of gibbsite, $Al(OH)_3$, and lime, $Ca(OH)_2$, or calcium carbonate, $CaCO_3$. These mixtures are milled dry, for 4 hours at 300 rev/min, in a Fritsch Pulverisette 5 mill, with carborundum balls the total mass of which is 15 times that of the milled mixture. By calcining at 1050° C. one or other of the mixtures thus premilled, the required calcium dialuminate is obtained, while the calcination of the same non-premilled mixtures gives only complex mixtures of other calcium aluminates.

V. P. Isupov et al., in the publication "Mechanochemical Synthesis of Superfine Lithium Gamma-Monoaluminate" which appeared in Chemistry for Sustainable Development (2012) Vol. 20; p. 55-59, describes the synthesis of lithium gamma-monoaluminate, $LiAlO_2$, from a mixture in stoichiometric proportions of gibbsite, $Al(OH)_3$, and lithium carbonate, $Li_2CO_3$. This mixture is milled dry for 3 to 10 minutes in a planetary mill having a milling capacity of 50 g and gives the aluminate sought after calcination at 850° C.

The publication by J. M. Rivas Mercury et al. "Synthesis of $CaAl_2O_4$ from powders: particle size effect", Journal of the European Ceramic Society 25 (2005) 3269-3279, describes a method for manufacturing calcium monoaluminate $CaAl_2O_4$ from calcium carbonate $CaCO_3$ with either α-aluminate α-$Al_2O_3$ (1), or amorphous gibbsite $Al(OH)_3$ (2) under very high-energy attrition. It is in particular described that, in order to obtain a homogeneous milled product under high-energy attrition, the starting mixture during the reaction (1) is moistened in an annular-passage mill with alumina beads 3 mm in diameter. The holding time of the starting reagents in the mill is approximately 15 minutes per cycle. The product obtained after milling is next dried (spray dried) and calcined in an electric furnace (temperatures ranging from 800° C. to 1400° C.) for 1 minute.

The publication by Adriana D. Ballarini et al. "Characterisation of $ZnAl_2O_4$ obtained by different methods and used as catalytic support of Pt", Catal Lett (2009) 129:293-302, describes the preparation and characterisation of $ZnAl_2O_4$ (spinel) using various techniques: ceramic method, mechanochemical synthesis in a wet medium (HMS) and coprecipitation. In particular, the HMS method is implemented using $\gamma$-$Al_2O_3$ and ZnO ($ZnO/\gamma$-$Al_2O_3$ molar ratio of 1.05), which are moulded in a fine powder, before forming a paste by adding distilled water. This paste is milled for 24 hours at ambient temperature in a ball mill containing zirconia balls 13 mm in diameter. The paste thus obtained is then dried at 110° C. for 6 hours and calcined at 900° C. for 12 hours.

The publication by Sonia A. Bocanegra et al. "The influence of the synthesis routes of $MgAl_2O_4$ on its properties and behaviour as support of dehydrogenation catalysts", Material Chemistry and Physics 111 (2008) 534-541, describes three methods for manufacturing $MgAl_2O_4$, including a method by mechanochemical synthesis. In this method, the milling of the paste takes place for 24 hours at ambient temperature.

Thus the second approach of preparing crystals of aluminate of another element also has several drawbacks. First of all, the time necessary for milling is relatively long (it usually lasts for several hours). Then the capacity of the mills is generally limited to a few tens of grams (low productivity) and is thus difficult to transpose to an industrial scale.

There thus exists a real need for a novel method for manufacturing crystals of aluminate of at least one other chemical element, such as a metal, a metalloid or a lanthanide, that allows the manufacture of such crystals quickly (unlike what is currently proposed in the prior art), while reducing the risks of pollution and manufacturing costs, thus making the method usable on an industrial scale.

The aim of the present invention is consequently to propose a novel method for manufacturing aluminate of at least one other element, at least partly avoiding the aforementioned drawbacks.

In particular, the aim of the present invention is to propose a novel method for manufacturing crystals of various aluminates that is simple to implement and industrially exploitable (namely not requiring a large number of steps), while reducing the times requiring particular heating, and not requiring any particular pressurisation.

SUBJECT MATTER OF THE INVENTION

To this end, the subject matter of the present invention is a method for manufacturing crystals of aluminate (hydrated or not) of one or more elements other than aluminium (Al), denoted "A", independently chosen from a metal, a metalloid or a lanthanide, said method comprising at least the following steps:
(1) putting in suspension starting reagents comprising at least: a source of the element aluminium and a source of said element or elements A that has a degree of oxidation ranging from 1 to 6, in a liquid medium, such as water, so as to form a suspension referred to as the "starting suspension", the mass concentration of the starting reagents being between 10 g/l and 1000 g/l, preferably between 50 g/l and 800 g/l, and particularly between 100 g/l and 600 g/l;
(2) the milling of said starting suspension at an ambient temperature of less than or equal to 50° C., preferably less than or equal to 35° C., in a three-dimensional liquid-medium microbead mill for a holding time of less than or equal to 5 minutes, preferably less than or equal to 1 minute, and ranging in particular from 5 to 25 seconds and especially from 10 to 20 seconds;
(3) the recovery, at the discharge of said three-dimensional microbead mill, a suspension called the "final suspension" comprising said starting reagents in activated form or crystals of aluminate of said element or elements A generally in hydrated form;
(4) optionally, the drying or shaping of a concentrate of the final suspension obtained at the end of step (3), so as to obtain a powder or a concentrate comprising, respectively, said starting reagents in activated form or said crystals, generally in hydrated form, of aluminate of said element or elements A;
(5) the calcination of said final suspension obtained at the end of step (3) when it comprises said starting reagents in activated form, or of the powder or concentrate obtained at the end of step (4) when it comprises said starting reagents in activated form, so as to obtain crystals, generally non-hydrated, of aluminate of said element or elements A.

According to the invention, the starting suspension comprises at least two starting reagents. Consequently, the source of the aluminium element and the source of said element or elements A are distinct.

In general, these starting reagents making it possible to obtain crystals of aluminate (hydrated or not) of one or more elements A are non-nanometric and non-thermosensitive.

According to the invention, "an ambient temperature of less than or equal to 50° C." comprises the following values: 50; 49; 48; 47; 46; 45; 44; 43; 42; 41; 40; 39; 38; 37; 36; 35; 34; 33; 32; 31; 30; 29; 28; 27; 26; 25; 24; 23; 22; 21; 20; 1 9; 18; 17; 16; 15; 14; 13; 12; 11; 10; etc., or all intervals situated between these values.

Equally, according to the invention, "a holding time of less than or equal to 5 minutes" comprises the following values: 5 min; 4 min; 3 min; 2 min; 1 min; 55 sec; 50 sec; 45 sec; 40 sec; 35 sec; 30 sec; 25 sec; 20 sec; 15 sec; 10 sec; 5 sec; etc., or all intervals situated between these values.

Generally, the calcination step (5) takes place at a temperature of between 400° C. and 1700° C., preferably between 500° and 1500° C., and in particular between 700° C. and 1200° C. for a period preferentially ranging from 15 minutes to 3 hours, in particular from 30 minutes to 1 hour 30 minutes and typically from 30 minutes to 1 hour.

In particular, temperatures of between 400° and 1700° C. encompass, according to the invention, the following temperatures as well as any interval between these values: 400, 450, 500, 550, 600, 650, 700, 750, 800, 850, 900, 950, 1000, 1050, 1100, 1150, 1200, 1250, 1300, 1350, 1400, 1450, 1500, 1550, 1600, 1650, 1700° C.

Within the meaning of the invention, the mass concentration of the starting reagents corresponds to the mass of the source of the aluminium elements+the mass of the source of said chemical element or elements A over the volume of the liquid medium.

In general, the final suspension comprises the starting reagents in activated form when these are insoluble in the liquid medium. Equally, the final suspension preferentially comprises said crystals of aluminate of said element or elements A generally in hydrated form when the starting reagents are at least partially soluble in water.

In particular, the source of the aluminium element has a +3 degree of oxidation.

For the rest of the description, unless specified otherwise, the indication of a range of values "from X to Y" or "between X and Y", in the present invention, should be taken to include the values X and Y. Furthermore, the sign "<" means strictly less than and the sign ">" means strictly greater, while the sign "≤" and "≥" means respectively "less than or equal to" and "greater than or equal to".

The crystals of aluminate of one or more elements A obtained, preferably after calcination of the aforementioned method, can be used to manufacture materials that are luminescent in the ultraviolet range, catalysts, in particular for synthesizing biofuels, photocatalytic materials, photoluminescent materials, dielectric ceramics, or strong transparent materials.

DETAILED DESCRIPTION OF THE INVENTION

The invention will be best understood and other aims, details, features and advantages thereof will emerge more clearly from a reading of the following description of example embodiments, with reference to the accompanying figures, in which.

Figure 8:
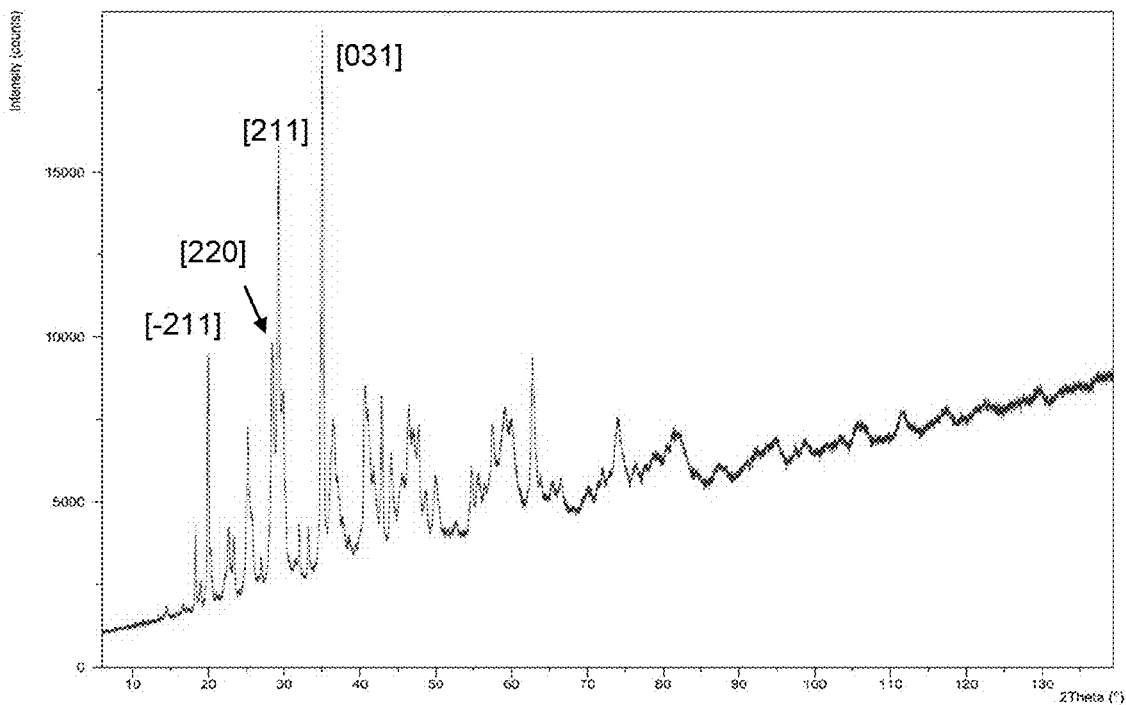

FIG. 8 is an X-ray diffractometry (XRD) spectrum of strontium aluminate crystals obtained according to the method of the invention using the following parameters: starting suspension comprising 300 g/l of raw materials $Al(OH)_3$ SH300+$Sr(OH)_2$-$8H_2O$, a rate of passage of the starting suspension in the mill of 30 l/h and a bead diameter of 500 μm; and a calcination temperature of 950° C. for 1 hour.

The Applicant sought the development of a novel method for manufacturing crystals of aluminates of one or more chemical elements other than aluminium (Al), denoted "A", suitable for being used on an industrial scale and simple to implement.

Within the meaning of the invention, the other element or elements A (denoted for example $A_1$, $A_2$, $A_n$) suitable for the method of the invention are independently chosen from a metal, a metalloid or a lanthanide.

According to a first embodiment, the method according to the invention makes it possible to manufacture crystals of aluminate of an element A. According to this embodiment, the crystals thus obtained (after calcination) can comply with the following general formula: $Al_xA_yOH_z$, with $0<x\le1$; $0<y\le1$ and $0\le z\le1$ and may correspond to the crystals of formulae: $MgAl_2O_4$, $CaAl_4O_7$, $LiAl_2O_5$, etc.

In general, z=0 (non-hydrated crystals).

According to a second embodiment, the method according to the invention makes it possible to manufacture crystals of aluminates of a plurality of elements A, denoted "A1", "A2", "An", etc. According to this variant, the crystals thus obtained (after calcination) can comply for example with the following general formula: $Al_v(Al_xA2_w)O_3$, with $0<x<1$; $0<v\le1$ and $0<w\le1$. Advantageously, according to this variant, w=(1−x) and/or v=1. Even more advantageously, v=1, x=½ and w=1−x=½. Thus the following crystals can be obtained with the method of the invention after calcination: $Sr(Al_{1/2}Nb_{1/2})O_3$, $Ca(Al_{1/2}Nb_{1/2})O_3$ or $Sr(Al_{1/2}Ta_{1/2})O_3$.

Typically, the method according to the invention makes it possible to manufacture crystals of aluminate of an element A.

To this end, the method for manufacturing crystals of aluminate of said element or elements "A" comprises at least the following steps:

(1) putting in suspension at least one source of the element aluminium that preferentially has a degree of oxidation of +3 and at least one source of said element or elements A that has a degree of oxidation ranging from 1 to 6, in a liquid medium such as water, so as to form a suspension referred to as "starting suspension", the mass concentration of the starting reagents being between 10 g/l and 1000 g/l, preferably between 50 g/l and 800 g/l, and particularly between 100 g/l and 600 g/l;

(2) milling said starting suspension at an ambient temperature of less than or equal to 50° C., preferably less than or equal to 35° C., in a three-dimensional liquid-medium microbead mill in a liquid than or equal to 1 minute, and ranging especially from 5 to 25 seconds and in particular from 10 to 20 seconds;

(3) recovering, at the outlet of said three-dimensional microbead mill, a suspension referred to as the "final suspension" comprising, depending on the nature of the starting reagents and the liquid medium, said starting reagents in activated form or crystals of aluminate of said element or elements A generally in hydrated form;

(4) optionally, drying or shaping the concentrate of the final suspension obtained at the end of step (3), so as to obtain a powder or a concentrate comprising, respectively,
said starting reagents in activated form, or
said crystals, generally in hydrated form, of aluminate of said element or elements A;

(5) calcination of said final suspension obtained at the end of step (3) when it comprises said starting reagents in activated form, or of the powder or concentrate obtained at the end of step (4) when it comprises said starting reagents in activated form, so as to obtain crystals, generally non-hydrated, of aluminate of said element or elements A.

Thus, depending on the nature of the starting reagents and of the liquid medium, it is possible to obtain, according to a first variant of the method according to the invention, crystals of aluminate of the element or elements A directly at the end of the milling step (3), namely in a single step not requiring any particular heating, and this in a very short time (in general a single pass in the mill suffices).

This first variant is in particular implemented when the starting reagents are, at least partially, soluble in the liquid medium and would also be able to effect an acid-base reaction. Without being bound by any particular theory, the Applicant discovered that, when an acid-base reaction could take place in the three-dimensional microbead mill, then there was a formation of crystals as from the milling step (3) and that it was therefore not necessary to proceed with a calcination step in order to obtain aluminate crystals.

By way of example, this first variant can be implemented when the source of the element or elements A has a basic character and is for example in hydroxide form and the liquid medium is water. In this case, in general, the source of the aluminium element, such as $Al(OH)_3$, will react in the water with the source of the element A in hydroxide form and thus allow a synthesis reaction of the aluminate crystals during the milling step. This is because, according to this variant, the final suspension issuing from step (3) comprises crystals of aluminate of the element or elements A, in particular crystals in hydrated form. This variant has been illustrated in example G° of the experimental part described below, which describes the manufacture of hydrated crystals of strontium aluminate $Sr_3Al_2(OH)_{12}$ by performing only steps (1) to (4) of the method of the invention using $Al(OH)_3$ and $Sr(OH)_2.8H_2O$ in water as starting reagents.

Obviously, other syntheses of hydrated aluminate crystals are possible using this first variant of the method, such as the manufacture of crystals of hydrated barium aluminate $(Ba_3Al_2(OH)_{12})$ or of crystals of hydrated sodium aluminate $(NaAl(OH)_4)$.

Equally, it is of course possible to carry out a step of calcination:
of said final suspension obtained at the end of step (3) when it comprises said crystals of aluminate of said element or elements A in hydrated form, or
of the powder or concentrate obtained at the end of step (4) when it comprises said crystals of aluminate of said element or elements A in hydrated form,
so as to obtain non-hydrated crystals of aluminate of said element or elements A.

This is because, this calcination step (5), not obligatory for obtaining crystals according to this first variant embodiment, does however make it possible to obtain crystals of aluminate of the element or elements A in non-hydrated form.

According to a second variant, in particular when the source of the element aluminium and the source of the element or elements A are insoluble in the aqueous medium, aluminate crystals are not obtained directly at the end of step (3); a calcination step is then necessary in order to finish the reaction of the combination aluminium+element or elements A in crystal form.

However, at the end of the milling step (3) according to the invention, the starting reagents have been mixed so intensely that they are said to be "activated", namely the source of the element aluminium is mixed very homogeneously and intimately with the source of the element or elements A. Without being bound also here by any theory, it would appear that the milling in the three-dimensional microbead mill according to the invention, even for a period of less than 5 minutes and generally less than 20 seconds and at ambient temperature, would cause a modification of the surface of the starting reagents, or even disorders in the crystalline lattice or crystalline defects. However, the Applicant discovered that, when the starting reagents are in "activated" form, this facilitates the subsequent calcination step. It was in fact found that the calcination step, necessary for obtaining aluminate crystals (for this variant embodiment), was less lengthy and did not require such a high temperature as the calcination steps described in the methods of the prior art.

For example, when the source of the element aluminium and the source of the element or elements A do not form an acid-base reaction in the liquid medium (water) or the source of the element A does not have a basic character in the liquid medium (as is the case for example D° or F° described in the experimental part below), then the starting reagents are in "activated" form at the end of the milling step (3) according to the invention.

Generally, the calcination step (5) takes place at a temperature of between 400° C. and 1700° C., preferably between 500 and 1500° C., and in particular between 700° C. and 1200° C. for a period preferentially ranging from 15 minutes to 3 hours, and in particular from 30 minutes to 1 hour 30 minutes.

Thus the Applicant has developed a general method which, unexpectedly, makes it possible to manufacture crystals of aluminate of one or more elements A (preferably one element A) in a very short time (a reaction time of less than or equal to 15 minutes and in general less than or equal to 1 minute), in only one or two steps (milling step followed where applicable by a calcination step). In particular, the first milling step is especially carried out at ambient temperature (the method does not require any particular heating step before proceeding with calcination), with minimal (non-polluting) consumptions of energy and water (the liquid medium), with furthermore excellent yield.

As will be demonstrated in the following tests, the method of the invention makes it possible in addition to obtain, surprisingly, aluminate crystals of excellent quality, namely very pure and with a fine and well controlled particle size distribution.

The method according to the invention also has the advantages of having a very low cost price (the raw materials used are in fact widely available, non-polluting and inexpensive) and having excellent reproducibility, which further distinguishes it from the methods described in the prior art. The method according to the invention also has the advantage of being able to be implemented continuously. These features are important for application on an industrial scale.

Furthermore, despite the great deal of research carried out on the synthesis of aluminate crystals, nobody has suggested the aforementioned method and in particular a milling step in a three-dimensional microbead mill using a starting suspension comprising at least: a source of aluminium generally having a +3 degree of oxidation and a source of said element or elements A having a degree of oxidation ranging from 1 to 6, or one of the precursors thereof, in an excess of liquid medium such as water.

"A degree of oxidation ranging from 1 to 6" according to the invention comprises the following values: 1; 2; 3; 4; 5; 6 and all intervals between these values.

The obtaining of aluminate has numerous industrial applications.

By way of example, the use of zinc aluminate gives rise to numerous applications in the field of catalysis, in particular as a catalyst for synthesizing biodiesel, but also photocatalysts (for degrading certain organic pollutants such as toluene), or as a semiconductor material.

Description of the Three-Dimensional Bead Mill

In order to give a better understanding of the method that is the subject matter of the invention, a three-dimensional microbead mill for obtaining an intimate and homogeneous mixture of a suspension of crystals of aluminate of said element or elements A will first of all be described below with reference to FIGS. 1 and 2.

Figure 1:
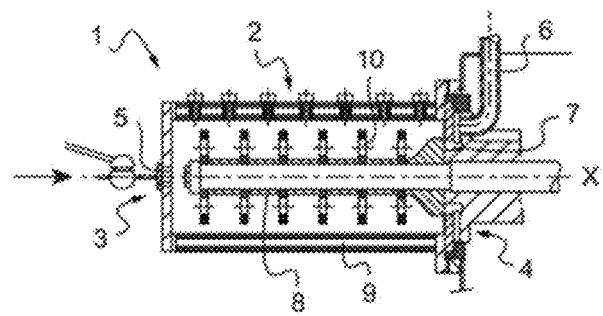
FIG. 1 shows a view in cross section along the longitudinal axis XX of a three-dimensional microbead mill in the liquid phase, according to a variant embodiment suitable for implementing the method according to the invention.

As illustrated in FIG. 1, a three-dimensional microbead mill 1 comprises at least:

- a roughly cylindrical shaped stationary milling chamber 2 extending along a longitudinal axis XX, said chamber 2 being at least partly filled with said microbeads (not shown) and comprises: at a first end 3 at least one inlet 5 used for introducing said starting suspension, and at a second end 4 an outlet 6 comprising a separation means 7 able to discharge the suspension formed in said chamber 2; and
- an agitator 8, disposed in the stationary milling chamber 2, in the form of a rod elongate along the longitudinal axis XX, said agitator 8 being able to move the assembly consisting of microbeads and starting suspension.

In particular, the inlet 5 is generally connected to a peristaltic pump (not shown). This pump brings the starting suspension, contained for example in a receptacle, such as a tank, into the milling chamber 2 via the inlet 5. The pump also, during the functioning of the three-dimensional mill, brings the starting solution at a certain rate that is adjustable, hereinafter referred to as the "passage rate". This passage rate also forms a flow in the milling chamber 2 for driving the starting suspension from the inlet 5 to the outlet 6.

The outlet 6 of the milling chamber 2 comprises in particular the system 7 for separating the microbeads from the final suspension comprising an intimate and homogeneous mixture of the raw materials. This separation means 7 may be a sieve, the orifices of which have a dimension less than that of the microbeads, or a separation slot the width of which is also suitable for retaining the microbeads within the chamber 2.

The internal wall 9 of the milling chamber 2 comprises, according to a first embodiment, a smooth internal surface. However, according to a variant embodiment that will be described below, fingers 11 may be provided on this internal surface 9.

As mentioned above, inside the milling chamber 2, the agitator 8 is disposed which, in addition to the passage rate, also makes it possible to obtain the movement of the starting suspension.

In particular, the agitator 8 is able to turn about the axis X via a rotary shaft (14, FIG. 2) in order to impart a swirling movement in the milling chamber 2 to the starting suspension and thus to effect an intense stirring between this starting suspension and the microbeads present in the chamber 2 along the internal wall 9 of this chamber 2.

In particular, the mill, via its rotary shaft 14, has a rotation speed greater than or equal to 100 revolutions per minute, advantageously greater than or equal to 1000 revolutions per minute (rev/min), preferably greater than or equal to 2000 revolutions per minute and typically greater than or equal to 2500 revolutions per minute.

Within the meaning of the invention, "a rotation speed greater than or equal to 100" comprises the following values: 100; 150; 200; 250; 300; 350; 400; 450; 500; 550; 600; 650; 700; 750; 800; 850; 900, 950; 1000 revolutions per minute comprises the following values 1000; 1100; 1200; 1300; 1400; 1500; 1600; 1700; 1800; 1900; 2000; 2100; 2200; 2300; 2400; 2500; 2600; 2700; 2800; 2900; 3000; 3100; 3200; 3300; 3400; 3500; 3600; 3700; 3800; 3900; 4000, 4500; 5000; 5500; 6000; etc., or all intervals lying between these values.

In general, the mill has a rotation speed ranging from 1000 rev/min to 5000 rev/min, in particular 1500 rev/min to 4500 rev/min, preferably 2000 rev/min to 4000 rev/min and typically 2800 to 3200 rev/min.

Figure 2:
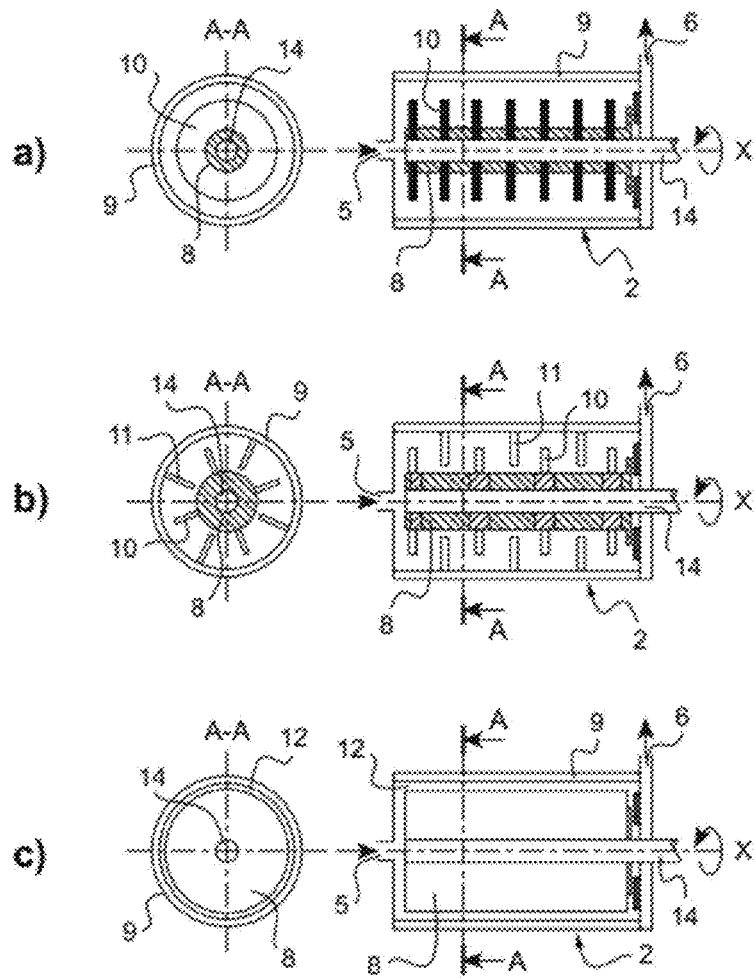
FIG. 2 shows views in cross section along the axis XX and the axis AA, of variants of three-dimensional microbead mills in the liquid phase according to FIG. 1 in which: (a) the agitator is of the disc type, (b) the agitator comprises fingers, and (c) the milling chamber is annular.

In order to improve this stirring, the agitator 8, just like the internal wall 9 of the chamber 2, may have various possible configurations shown for example in FIG. 2.

According to a first configuration illustrated in FIG. 2a, the agitator 8 comprises discs 10 along its elongate rod, disposed perpendicular thereto. The number thereof may vary from 2 to 8, preferably from 2 to 5. These discs 10 on the one hand improve the milling of the starting suspension by stirring the microbeads more and secondly accelerate the reaction time.

According to a second configuration illustrated in FIG. 2b, the agitator 8 may also comprise, along its rod, one or more discs 10 disposed perpendicularly and which are furthermore able to cooperate with fingers 11, disposed perpendicularly, with respect to the internal wall 9 of the chamber 2. A finger is in particular in the form of a ring that extends perpendicularly from the wall 9. For this configuration, the discs 10 and the fingers 11 are disposed in a staggered manner, namely the discs 10 and the fingers 11 are disposed so as to alternate in the chamber 2. Furthermore, the thickness of the rod 8 is increased with respect to the previous configuration (FIG. 2a) so that the periphery of the discs 10 is close to the internal wall 9 and so that the periphery of the fingers 11 is close to the periphery of the rod of the agitator 8. Thus, in this configuration, the volume of the chamber is reduced compared with the previous configuration, consequently affording better stirring between the starting suspension, the microbeads and the internal wall 9 of the chamber 2.

The volume of the chamber 2 may also be reduced, as illustrated in FIG. 2c. In this configuration, the agitator 8 has an outside diameter slightly less than the inside diameter of the chamber 2, thus forming an annular chamber 12 of small volume disposed between the external wall of the agitator 8 and the internal wall 9 of the chamber 2. The microbeads (not shown) are disposed in this annular chamber 12. During the functioning of this configuration, the starting suspension is introduced through the inlet 5 at a certain rate, and will then travel through the annular chamber 12 as far as the outlet 6, while being stirred by the microbeads.

In general, the mill that is suitable for implementing the method according to the invention comprises a milling chamber having a diameter of 75 mm to 300 mm with a length of 80 mm to 900 mm and an agitator having a size ranging from 65 mm to 260 mm. Thus the volume of the milling chamber varies from 0.35 litres to 600 litres, preferably from 0.35 litres to 400 litres, and typically from 0.35 litres to 62 litres.

Within the meaning of the invention, "a volume of the milling chamber ranging from 0.35 litres to 600 litres" comprises the following values: 0.35; 0.5; 0.8; 1; 2; 3; 4; 5; 6; 7; 8; 9; 10; 15; 20; 25; 30; 35; 40; 45; 50; 55; 60; 65; 70; 80; 85; 90; 100; 110; 120; 130; 140; 150; 160; 170; 180; 190; 200; 210; 220; 230; 240; 250; 260; 270; 280; 290; 300; 350; 400; 450; 500; 550; 600, etc., or all intervals lying between these values.

The geometry of the milling chamber and of the agitator can be adjusted by a person skilled in the art according to the quantity of reagents introduced initially, as well as the reaction time required. For example, it is also possible for the milling chamber 2 to comprise an accelerator in order to improve the milling of the starting suspension.

Furthermore, the microbeads housed in the milling chamber 12 and suitable for the method according to the invention are substantially spherical in shape and have a mean diameter of less than or equal to 5 mm, generally ranging from 0.05 mm to 4 mm, preferably from 0.2 to 3 mm, in particular from 0.3 to 2 mm, and typically around 0.5 to 1 mm. Preferably, the diameter of the microbeads is less than or equal to 1 mm and is typically around 0.05 mm to 1 mm.

They are preferentially chosen from microbeads having high hardness and resisting abrasion relatively well.

In particular, the microbeads have a Vickers hardness measured in accordance with EN ISO 6507-1 greater than or equal to 900 HV1, preferably ranging from 900 HV1 to 1600 HV1, typically ranging from 1000 to 1400 HV1 and in particular around 0.05 mm to 1 mm.

Within the meaning of the invention, "a Vickers hardness greater than or equal to 900 HV1" comprises the following values: 900; 910; 920; 930; 940; 950; 960; 970; 980; 990; 1000; 1010; 1020; 1030; 1040; 1050; 1060; 1070; 1080; 1090; 1000; 1110; 1120; 1130; 1140; 1150; 1160; 1170; 1180; 1190; 1200; 1300; 1400; 1500; 1600; 1700; etc., or all intervals lying between these values.

Advantageously, they have a high true density. In general, the microbeads according to the invention have a true density greater than or equal to 2 g/cm$^3$, in particular ranging from 2 to 15 g/cm$^3$, preferably from 3 to 12 g/cm$^3$, and typically from 4 to 10 g/cm$^3$.

Thus the microbeads according to the invention may be ceramic microbeads (zirconium oxide $ZrO_2$, zirconium silicate $ZrSiO_4$); steel microbeads, tungsten carbide microbeads, glass microbeads or one of the combinations thereof.

Preferably, the microbeads are made from ceramic since they do not give rise to any pollution through wear thereof.

In particular, the microbeads are made from zirconium oxide.

Optionally, the zirconium oxide microbeads may be stabilised by another oxide, such as cerium oxide, yttrium oxide and/or silicon.

By way of examples, the following compositions, summarised in Table 1 below, are suitable for forming the microbeads according to the invention:

TABLE 1

| Composition of microbeads | HV1 hardness | True density (g/cm$^3$) | Manufacturer |
|---|---|---|---|
| Zirconium oxide microbeads stabilised by cerium oxide | 1180 | ≥6.10 | Saint-Gobain (Zirmil ®Y Ceramic Beads) |

TABLE 1-continued

| Composition of microbeads | HV1 hardness | True density (g/cm$^3$) | Manufacturer |
|---|---|---|---|
| 80% $ZrO_2$ 20% CeO | | | or EIP (Procerox ® ZO Cer) |
| Zirconium oxide microbeads stabilised by yttrium 95% $ZrO_2$ <5% $Al_2O_3$ Remainder: $Y_2O_3$ | 1250 | ≥5.95 | EIP (Procerox ® ZO (Y)) |
| Zirconium oxide microbeads stabilised by yttrium and silicon: 78% $ZrO_2$, 12% $SiO_2$, 5% $Al_2O_3$ and 4% $Y_2O_3$ | >700 | >4.80 | Saint-Gobain (ER120 Ceramic Beads) |
| Zirconium silicate microbeads $ZrSiO_4$ | ≥800 | >6.5 | Saint-Gobain (Rimax Ceramic Beads) |
| Glass microbeads | 500 | >3.76 | — |
| Steel microbeads | 700 | >7.7 | — |

Generally, the microbeads that are suitable for the method of the invention are not made from glass or solely from glass.

In particular, the microbeads represent, by volume, with respect to the total volume of the stationary chamber 2, from 50% to 85%, preferably from 55% to 70%.

Within the meaning of the invention, "a volume of 50% to 85%" comprises the following values: 50; 55; 60; 65; 70; 75; 80; 85; etc., or all intervals lying between these values.

By way of example, the three-dimensional wet-phase microbead mills suitable for implementing the method according to the invention may correspond to mills sold by the companies WAB, Dyno-Mill range: Multi Lab, ECM and KD, NETZCH, for example LABSTAR LS1, or Alpine Hosokawa, for example, Agitated Media Mill AHM.

DESCRIPTION OF THE METHOD ACCORDING TO THE INVENTION

The manufacturing method according to the invention will now be described more explicitly below.

As indicated previously, the manufacture of crystals of aluminate of one or more elements A according to the invention comprises first of all (1) a step of putting the starting reagents in suspension. These comprise at least: a source of aluminium typically having a degree of oxidation +3 and at least one source of said element or elements A, preferably of said element A, having a degree of oxidation ranging from +1 to +6. The suspension obtained is hereinafter referred to as the "starting suspension".

The starting suspension is conventionally prepared by mixing the starting reagents with the liquid medium in a suitable device, such as a receptacle or a tank, provided with an agitation system (such as a magnetic agitator, agitation blades, etc.). The device and the agitation system can be adapted by a person skilled in the art according to the quantity of crystals of various aluminates of the element or elements A to be manufactured.

As mentioned above, according to the first variant or the second variant embodiment, the liquid medium may be chemically inert or not.

In particular, according to the first variant embodiment, the liquid medium, such as water ($H_2O$), can react with the starting reagents and in particular the source of the element or elements A having a basic character (if it is for example in the form of a hydroxide) and form an acid-basic reaction with the source of the element aluminium (such as $Al_2O_3$ or $Al(OH)_3$).

However, usually, the liquid medium is chemically inert, namely it does not react with the source of aluminium and the source of the element or elements A. This corresponds to the second variant of the method of the invention (the starting reagents are insoluble in the liquid medium; thus, at the end of the milling step, an final suspension comprising the starting reagents in activated form is obtained).

The liquid medium will generally be water ($H_2O$). However, the liquid medium may also be an organic solvent, such as methanol or isopropanol.

In general, this step (1) is performed in a high excess of liquid medium (water). This is because the mass concentration of starting reagents (the source of the element aluminium+source of said chemical element or elements A) is between 10 g/l and 1000 g/l, preferably between 50 g/l and 800 g/l, and particularly between 100 g/l and 600 g/l.

This excess of liquid medium in particular improves the synthesis of the crystals of aluminate of the element or elements A (first variant) or improves the activation of the starting reagents in the mill by affording an intense mixing (second variant embodiment). This is because an excess of liquid medium promotes the movement of the microbeads in the mill for better milling of the starting suspension and therefore better synthesis of the crystals of aluminate of the element or elements A or better mixing.

Preferably, the source of the element aluminium and the source of the element or elements A are mixed in the starting suspension in a stoichiometric proportion. It is of course possible to deviate substantially from this stoichiometric proportion if for example a composition containing an excess of one of the reagents is required, and falling within the scope of the method of the invention.

Generally, the molar ratio (Al): (the element or elements A) varies from 0.001 to 10, in particular from 0.01 to 5.

By way of example, the source of the element aluminium generally having a degree of oxidation of +3 may be chosen from one or more of the following compounds: gibbsite ($Al((OH)_3$), boehmite $AlO(OH)$, alumina ($Al_2O_3$), such as $\alpha$-$Al_2O_3$ (carborundum), one of the precursors thereof or one of the mixtures thereof.

Even more preferably, the source of the element aluminium is chosen from: $Al(OH)_3$ or $\alpha$-$Al_2O_3$ or a mixture thereof.

In general, the source of said element or elements A is in the form of an oxide, a dioxide, a peroxide, a hydroxide, a di- or tri-hydroxide, an oxide hydroxide, a carbonate, or one of the precursors thereof.

As mentioned above, the element or elements A are independently chosen from a metal, a metalloid or a lanthanide, "A" however being different from aluminium.

Said element or elements A may in particular be chosen from:
  alkaline metals: lithium (Li), sodium (Na), potassium (K), rubidium (Rb) or caesium (Cs);
  the following alkaline earth metals: le beryllium (Be), magnesium (Mg), calcium (Ca), strontium (Sr) or barium (Ba);
  the following transition metals: titanium (Ti), chromium (Cr), manganese (Mn), iron (Fe), cobalt (Co), nickel (Ni), copper (Cu), zinc (Zn), yttrium (Y), zirconium (Zr), niobium (Nb), molybdenum (Mo), cadmium (Cd), hafnium (Hf) or tantalum (Ta);
  the following post-transition metals: gallium (Ga), indium (In), tin (Sn) and bismuth (Bi);
  the following metalloids: boron (B), silicon (Si);
  the following lanthanides: lanthanum (La); and
  or one of the combinations thereof.

In general, the element or elements A are chosen independently from: Ba, Ca, Fe, Li, Mg, Zn, Zr. In particular, Ba, Ca, Li, Mg, Zn are preferred.

Thus, within the meaning of the invention, the source of the element or elements A may be chosen from:
  LiOH, $Li_2CO_3$ or one of the precursors thereof, so as in particular to obtain after calcination crystals of lithium aluminate, for example of formulae: $LiAlO_2$ or $LiAl_5O_8$,
  NaOH, $Na_2CO_3$, $Na_2O$ or one of the precursors thereof, so as in particular to obtain after calcination crystals of sodium aluminate, for example of formulae: $AlNaO_5$, $NaAl_2O_4$,
  KOH, $K_2CO_3$, or one of the precursors thereof, so as in particular to obtain after calcination potassium aluminate crystals, for example of formulae: $KAlO_2$;
  RbOH, $Rb_2CO_3$ or one of the precursors thereof, so as in particular to obtain $Rb_9(AlO_4)(OH)_4$ after calcination rubidium aluminate crystals, for example of formulae: $Rb_6Al_2O_6$;
  $CCs_2O_3$, $Cs(OH)$-$yH_2O$ or one of the precursors thereof, so as in particular to obtain after calcination caesium aluminate crystals, for example of formulae: $CsAlO_2$, $CsAlO_6$;
  $Be(OH)_2$, BeO, $Be(CO_3)_2(OH)_2$ or one of the precursors thereof, so as in particular to obtain after calcination beryllium aluminate crystals, for example of formulae: $BeAl_2O_4$,
  MgO, $Mg(OH)_2$, $MgCO_3$, $C_4Mg_4O_{12}$—$H_2MgO_2$-$xH_2O$ or one of the precursors thereof so as to obtain in particular after calcination magnesium aluminate crystals, for example of formulae: $MgAl_2O_4$;
  CaO, $CaCO_3$, $Ca(OH)_2$ or one of the precursors thereof so as to obtain in particular after calcination calcium aluminate crystals, for example of formulae: $CaAl_4O_7$, $CaAl_2O_4$ or $Ca_{12}Al_{14}O_{33}$;
  $Sr(OH)_2$, SrO, $SrCO_3$ or $SrO_2$, or one of the precursors thereof, so as to obtain in particular after calcination strontium aluminate crystals, for example of formulae: $SrAl_2O_4$ or $Sr_3Al_2O_6$;
  BaO, $BaO_2$, $BaCO_3$, $Ba(OH)_2$ or one of the precursors thereof, so as to obtain after calcination barium aluminate crystals, for example $BaAl_2O_4$;
  TiO, $TiO_2$, $H_2TiO_3$ or one of the precursors thereof, so as in particular to obtain after calcination titanium aluminate crystals, for example of formulae: $TiAlO_3$ or $TiAl_2O_5$;
  $CrO_3$, $Cr_2O_3$, $Cr_2(CO_3)_3$, $Cr(OH)_3$ or one of the precursors thereof, so as to obtain in particular chromium aluminate crystals, for example of formulae: $CrAl_2O_4$;
  $Mn(OH)_2$, $MnCO_3$, MnO, $MnO_2$, $Mn_2O_3$, $Mn_3O_4$ or one of the precursors thereof so as to obtain in particular manganese aluminate crystals of formula $MnAl_2O_4$;
  $Fe_2O_3$, $FeO(OH)$, $Fe(OH)_3$, $FeCO_3$, $Fe_3O_4$ or one of the precursors thereof, so as to obtain in particular after calcination iron aluminate crystals having for example the formula $FeAl_2O_4$,
  CoO, $Co_3O_4$, $Co_2O_3$, $CoCO_3$, $Co(OH)_2$, or one of the precursors thereof, so as to obtain in particular after calcination cobalt aluminate crystals with for example the formula $CoAl_2O_4$;

NiO, $Ni_2O_3$, $Ni(OH)_2$, NiO(OH), $NiCO_3$ or one of the precursors thereof, so as to obtain in particular after calcination nickel aluminate crystals with for example the formula $NiAl_2O_4$;

$Cu(OH)_2$, $CuCO_3$, CuO, $Cu_2O$, or one of the precursors thereof, so as to obtain in particular after calcination copper aluminate crystals with for example the formula $CuAlO_2$ or $CuAl_2O_4$, ZnO, $ZnO_2$, $Zn(OH)_2$, $ZnCO_3$ or one of the precursors thereof, so as to obtain in particular after calcination zinc aluminate crystals with for example the formula $ZnAl_2O_4$, $Y_2O_3$ or one of the precursors thereof, so as to obtain in particular after calcination yttrium aluminate crystals with for example the formula $Y_3Al_5O_{12}$, $Zr(OH)_4$, $Zr(OH)_2CO_3$—$ZrO_2$, $ZrO_2$, or one of the precursors thereof, so as in particular to obtain after calcination zirconium aluminate crystals, for example of formula $ZrAl_2O_4$, $Zr_3Al_2O_9$ or $AlZrO_2$, $Nb_2O_5$, $NbO_2$, $Nb(OH)_5$ or one of the precursors thereof, so as in particular to obtain after calcination niobium aluminate crystals, for example of formula $NbAlO_4$;

$MoO_3$, $MoO_2$, or one of the precursors thereof, so as in particular to obtain after calcination molybdenum aluminate crystals, for example of formula $MoAl_2O_4$ or $Mo_3Al_2O_{12}$;

$Cd(OH)_2$, CdO, $CdCO_3$ or one of the precursors thereof, so as in particular to obtain after calcination cadmium aluminate crystals, for example of formula $CdAl_2O_4$;

$Ta(OH)_5$, $Ta_2O_5$ or one of the precursors thereof, so as in particular to obtain after calcination tantalum aluminate crystals, for example of formula $TaAl_2O_4$, $Ga(OH)_3$, $Ga_2O_3$ or one of the precursors thereof, so as in particular to obtain after calcination gallium aluminate crystals, for example of formula $GaAl_2O_4$, $In(OH)_3$, $In_2O_3$ or one of the precursors thereof, so as in particular to obtain after calcination indium aluminate crystals, for example of formula $InAl_2O_4$ or $InAlO_3$, $Sn(OH)_2$, $SnO_2$, SnO or one of the precursors thereof, so as in particular to obtain after calcination tin aluminate crystals, for example of formulae: $SnAl_2O_4$;

$Bi_2O_3$, $(BiO)_2CO_3$, $Bi(OH)_3$ or one of the precursors thereof, so as in particular to obtain after calcination bismuth aluminate crystals, for example of formulae: $Al_6BiH_2O_{13}$;

$La_2O_3$, $La_2(CO_3)_3$, $La(OH)_3$ or one of the precursors thereof, so as in particular to obtain after calcination lanthanum aluminate crystals, for example of formulae: $LaAlO_3$, $LaAl_2O_4$, $B_2O_3$ or one of the precursors thereof, so as in particular to obtain after calcination boron aluminate crystals, for example of formula: $AlBO_3$, $Al_4B_2O_9$, $Al_{18}B_4O_{33}$, $SiO_2$, $H_2SiO_3$ or one of the precursors thereof, so as in particular to obtain after calcination silicon aluminate crystals, for example of formula: $SiAl_2O_5$, or one of the combinations thereof.

Within the meaning of the invention, "precursor" means any chemical compound which, in contact with water, moisture and/or air ($CO_2$, etc.), makes it possible to synthesise the aforementioned compounds. By way of example, $Li_2O_2$ (peroxide) makes it possible to form lithium hydroxide LiOH by reacting with water. The precursors thus encompass for example the following compounds: $Li_2O/Li_2O_2/Na_2O_2/MgO_2$, $CaO_2$, etc.

In general, the sources of aluminium and of the element or elements A are in powder form.

For example, alpha aluminium oxide suitable for the present invention is also found in powder form and in general has a particle size less than or equal to 100 μm and preferably less than or equal to 10 μm, and in particular the size of the particles ranges from 0.01 μm to 1 μm. The aluminium oxide of CAS number: 1344-28-1 marketed for example by the company Baikowski under the reference BA15, having a 100% purity in alpha phase, is suitable for implementing the method of the invention.

The source of the element or elements A is also found in powder form. In general, the size of the particles is less than or equal to 100 μm, preferably less than or equal to 50 μm and advantageously less than or equal to 20 μm, as ranging from 0.01 μm to 20 μm. Thus it is not necessary for the source of the element A to be on a nanometric scale.

For example, the magnesium hydroxide suitable for the present invention preferably has a particle size of less than or equal to 100 μm and preferably less than or equal to 50 μm, such as less than or equal to 30 μm, and in particular the size of the particles may range from 0.01 μm to 20 μm. The magnesium hydroxide of CAS number 1309-42-8, and marketed for example by the company Toplus Inc., with a purity greater than or equal to 99%, is suitable for implementing the method of the invention.

Preferably, the aluminium source and the source of the element or elements A have a high purity, in general greater than or equal to 90%, in particular greater than or equal to 95% and typically greater than or equal to 99%, or even greater than or equal to 99.9%.

Once the starting suspension is prepared, this is brought to the three-dimensional microbead mill 1 generally by means of the adjustable-rate peristaltic pump via the inlet 5. The peristaltic pump makes it possible to continue the mixing of the starting suspension before entering the chamber 2. Furthermore, as indicated previously, this pump makes it possible to introduce the starting suspension into the chamber 2 with a controlled passage rate.

Generally, the starting suspension is introduced at a passage rate greater than or equal to 10 l/h.

Within the meaning of the invention, "a passage rate greater than or equal to 10 l/h" comprises the following values: 10 l/h; 15 l/h; 20 l/h; 25 l/h; 30 l/h; 35 l/h; 40 l/h; 45 l/h; 55 l/h; 60 l/h; 65 l/h; 70 l/h; 80 l/h; 85 l/h; 90 l/h; 95 l/h; 100 l/h; 110 l/h; 120 l/h; 130 l/h; 140 l/h; 150 l/h; 50 l/h; 55 l/h; 60 l/h; 65 l/h; 70 l/h; 75 l/h; 80 l/h; 85 l/h; 90 l/h; 95 l/h; 100 l/h; 105 l/h; 110 l/h; 115 l/h; 120 l/h; 125 l/h; 130 l/h; 135 l/h; 140 l/h; 145 l/h; 150 l/h; 155 l/h; 160 l/h; 165 l/h; 170 l/h; 175 l/h; 180 l/h; 200 l/h; 300 l/h; 400 l/h; 500 l/h; 600 l/h; 700 l/h; 800 l/h; 900 l/h; 1 $m^3$/h; 2 $m^3$/h; 3 $m^3$/h; 4 $m^3$/h; 5 $m^3$/h; 6 $m^3$/h; 7 $m^3$/h; 8 $m^3$/h; 9 $m^3$/h; 10 $m^3$/h; 11 $m^3$/h; 12 $m^3$/h; 13 $m^3$/h; 14 $m^3$/h; 15 $m^3$/h; etc., or all intervals lying between these values.

In particular, the starting suspension is introduced at a passage rate ranging from 10 to 130 l/h, preferably 20 to 100 l/h and typically 30 to 90 l/h.

Naturally, the passage rates may vary according to the size of the three-dimensional microbead mill used for implementing the method. For example, for a three-dimensional microbead mill having a stationary chamber 2 with a volume of 0.5 litres, the passage rate can be around 450 to 150 l/h, such as approximately 45 l/h; while for larger mills having in particular a stationary chamber 2 of 60 litres, the rate can be around 2 to 15 $m^3$/h, such as approximately 4 $m^3$/h.

Once the starting suspension is introduced into the chamber 2, the milling step (2) begins.

Under the effect of the flow created by the passage rate, the starting suspension travels through the stationary chamber 2 from the inlet 5 to the outlet 6, while being moved by the agitator 8, which affords intense stirring of this suspension with the microbeads and, where applicable with the discs 10, the fingers 11, etc., along the internal wall 9 of the chamber 2.

The rotation speed of the agitator can for example vary from 4 to 20 Pi rad/s, preferably 4 to 8 Pi rad/s.

According to the invention, "a rotation speed ranging from 4 to 20 Pi rad/s" comprises the following values: 20; 19; 18; 17; 16; 15; 14; 13; 12; 11; 10; 9; 8; 7; 6; 5; 4 and all ranges between these values.

The holding time of the starting suspension is less than or equal to 5 minutes, preferably less than or equal to 1 minute, and goes in particular in the mill from 1 to 25 seconds and in particular 5 to 20 seconds, such as 5 to 15 seconds. It is in fact inherent in the apparent volume of the beads and the passage rate.

For example, if the apparent total volume of the beads is 270 cm$^3$ (beads with an apparent density of 3.7 g/cm$^3$) for a chamber volume of 360 cm$^3$ and the rate of introduction of the suspension is 30 l/h, that is to say 8.3 cm$^3$/s, then the holding time of the suspension in the chamber 2 is estimated at approximately 11 seconds. Consequently the holding time may advantageously be adjusted, for example by controlling the apparent density of the microbeads, as well as the passage rate.

"Apparent volume" means the volume of the microbeads including the interstitial air between the beads. The apparent density is the ratio between the mass of the microbeads and the apparent volume.

Furthermore, by acting on the size of the microbeads and the passage rate, crystals of greater or lesser fineness can be obtained. For example, a finer milling can be obtained if the flow rate of the starting suspension is slowed.

The milling step can be carried out in continuous mode or discontinuous mode in one or more passes (pendular mode or in recirculation).

When it is carried out in discontinuous mode, the number of passes of the so-called starting suspension may be from 1 to 10, preferentially 1 to 5 (namely, after a first pass, the suspension is recovered at the outlet 6 and is reinjected once again, by means of the pump, into the chamber 2 via the inlet 5 to allow a second pass). In particular, the number of passes of the starting suspension is 1.

This is because the Applicant has noted that a single pass through the microbead mill, despite a very short holding time, is sufficient to implement the method according to the invention and to allow the synthesis of crystals, hydrated or not, of aluminate of the element or elements A.

Thus this milling step will preferably be carried out in continuous mode.

Advantageously, this milling step takes place at an ambient temperature of less than or equal to 50° C., namely usually at an ambient temperature ranging from 15° C. to 45° C., in particular from 18° C. to 35° C. and in general around 20° C. to 25° C. In particular, the starting reagents/starting suspension are/is introduced into the mill at ambient temperature (generally around 20°–25° C.). However, it may happen that, according to the starting reagents used, an exothermic reaction takes place during this milling step and that the temperature rises slightly (generally the temperature at the discharge from the mill is less than or equal to 50° C.).

This is because this step according to the invention does not require any particular heating in order, either at the end of the recovery step (3) or at the end of the calcination step (5), to obtain aluminate crystals.

Once the milling step (2) has been carried out, recovery at the outlet of the three-dimensional microbead mill of an final suspension is proceeded with (3), comprising:
   either very mainly crystals, usually hydrated, of aluminate of the element or elements A (in particular when the starting reagents are in stoichiometric proportion and when they make it possible to form an acid-base reaction with the liquid medium), of very satisfactory purity and size (first variant embodiment);
   or starting reagents in activated form (second variant embodiment). As mentioned above, the micromilling carried out at step 2, even if it does not directly allow the synthesis of aluminate crystals according to this mode, does however make it possible to activate the starting reagents, which will thereafter facilitate the calcination step (5) and thus the synthesis of the crystals during this last step.

Optionally, following the recovery step (3), said final suspension described above is concentrated or dried (4), so as to obtain respectively a powder or a concentrate of crystals (generally hydrated) of aluminate of said element or elements A, or a powder or concentrate of the starting reagents in activated form.

According to one feature, the final suspension may be dried in free air.

According to another feature, the final suspension may be dried by stoving or calcination, such as at a temperature of 100° to 400° C. for 1 to 4 hours.

The dried or concentrated product is generally stored until use thereof in aqueous paste form or mixed with a solvent. It may also be dried and stored in a sealed receptacle.

Where applicable, following the recovery step (3) or following the drying step (4), calcination (5) of said final suspension described above is proceeded with.

For this purpose, the final suspension recovered following step (3) or the powder or concentrate recovered following step (4) is disposed in crucibles, which may be made from porcelain or aluminium, and then calcined (5) in a furnace, for example a stationary furnace or a passage furnace. This calcination step generally takes place at a temperature of between 400° C. and 1700° C., preferably between 500° C. and 1500° C., and particularly between 600° C. and 1250° C.; for a period of between for example 30 minutes and 4 hours, preferably between 30 minutes and 1 hour 30 minutes.

By way of example, the calcination temperatures for the following elements A may be as follows (given indicatively):

TABLE 2

| A crystals | Ba BaAl$_2$O$_4$ | Ca CaAl$_4$O$_7$ | Li LiAlO$_2$ | Li LiAl$_5$O$_8$ | Mg MgAl$_2$O$_4$ | Sr Sr$_3$Al$_2$O$_6$ | Zn ZnAl$_2$O$_4$ |
|---|---|---|---|---|---|---|---|
| T ° * | 1050° C. | 1050° C. | 500° C. | 950° C. | 1050° C. | 950° C. | 650° C. |

* minimum calcination temperature

A person skilled in the art will be able to adapt the calcination temperature according to the nature of the element A and the crystals that he wishes to manufacture. Equally, the minimum temperature is given indicatively, and will depend on the type of calcination furnace or the presence of moisture during calcination.

The method according to the invention thus makes it possible to manufacture crystals of aluminate of the element or elements A.

In particular, according to the first variant embodiment, the calcination of said final suspension obtained at the end of step (3) when it comprises said crystals of aluminate of said element or elements A in hydrated form or of the powder or concentrate obtained at the end of step (4) when it comprises said crystals of aluminate of said element or elements A in hydrated form, makes it possible to form non-hydrated crystals of aluminate of said element or elements A.

Equally, according to the second variant embodiment, the calcination of said final suspension obtained at the end of step (3) when it comprises said starting reagents in activated form, or the powder or concentrate obtained at the end of step (4) when it comprises said starting reagents in activated form, makes it possible to form crystals, generally non-hydrated, of aluminate of said element or elements A.

The present invention also relates to the use of the crystals of aluminates of said element or elements A obtained according to the method for manufacturing materials that are luminescent in the ultraviolet range, catalysts, in particular for synthesising biofuels, photocatalytic materials, photoluminescent materials, dielectric ceramics, or strong transparent materials.

EXAMPLES

The description of the following tests is given by way of purely illustrative and non-limitative example. Unless indicated otherwise, the results are indicated by mass.

A° CHARACTERISATION BY XRD

The X-ray diffractometry (XRD) spectra were collected with a D8 ADVANCE Series II diffractometer sold by Bruker, using CuKα1 radiation (0.15406 nm) in accordance with the Bragg-Brentano configuration.

The detector used is a LynxEye 1D detector from Bruker. The aperture angle of the detector is 3° (150 bands).

The XRD measurements were carried out at between 10° and 140° (to scale 2θ) with a step of 0.008° (1 s/step).

B° PROCEDURE FOR PREPARING THE SAMPLES TESTED

Apparatus

The tests were carried out in a Dyno Mill MultiLab three-dimensional microbead mill from Willy A. Bachofen A G, containing 1 kg of microbeads.

The microbeads are made from zirconium oxide and have a diameter of 0.5 mm. The characteristics of the microbeads used for the test are summarised in Table 3 below:

TABLE 3

| Beads | 500 µm |
| --- | --- |
| Composition (% by mass) | 93% $ZrO_2$ 5% $Y_2O_3$ |

TABLE 3-continued

| Beads | 500 µm |
| --- | --- |
|  | 2% others |
| Specific density | 6 g/cm$^3$ |
| Apparent density | 3.7 kg/l |
| Vickers hardness | 1250 HV1 |

The 500 µm microbeads are in particular sold under the trade name Zirmil® Y Ceramic Beads by the company Saint-Gobain.

The milling chamber of the mill has a capacity of 309 ml and is 80% filled, by volume, with respect to its total volume and according to the test, with the microbeads described above.

In operation, the microbeads are stirred by an agitator at a rotation speed of 2890 rev/min. The agitator also comprises two polyurethane mixer discs 64 mm in diameter.

Raw Materials

For the tests, the starting raw materials are:

the source of the element aluminium:
   gibbsite $Al(OH)_3$ of a laboratory type, having an EDTA dosage of $Al_2O_3 \geq 50\%$, sold by Sigma Aldrich;
   gibbsite $Al(OH)_3$ produced on an industrial scale, of purity≥99.7%, sold under the reference SH300 by Alteo;
   alpha alumina $Al_2O_3$, with a purity of 100% in alpha phase, sold by Baikowski under the reference BA15;

the mineral source of the metal element may be:
   magnesium oxide MgO, of purity≥99%, sold by Toplus Inc.;
   barium peroxide $BaO_2$, of purity≥95%, sold by Toplus Inc.;
   calcium carbonate $CaCO_3$, having a purity 99%, sold by La Provencale under the name Mikhart 5;
   strontium hydroxide octohydrate $(Sr(OH)_2 \cdot 8H_2O)$ of purity≥98% sold by Chongquing Hua'nan Salt Chemical Co, Ltd.; and
   zinc oxide (ZnO) having a purity 99% sold by A.M.P.E.R.E. Industrie.

General Procedure Used for the Tests:

To carry out each of the tests below, the following steps are performed:

a starting suspension is prepared in a beaker from the source of the element aluminium and the source of the element A, in a stoichiometric proportion, in a liquid phase (water), and then the starting suspension is stirred using a magnetic agitator;

it is next brought, via an adjustable-rate peristaltic pump, to the Dyno Mill MultiLab mill described above: the passage rate in the mill may be as much as 60 l/h;

the starting suspension is then milled (2) in the three-dimensional mill comprising 0.5 mm diameter microbeads for a certain period (which depends on the passage rate of the starting suspension) at ambient temperature (20°-25°-C), thus making it possible, at the outlet of the mill, to obtain an intimate homogeneous mixture of the initial reagents (namely of the aluminium source and the source of the element A);

next, in general terms, the final suspension comprising either the starting reagents in activated form or crystals of aluminate of the element or elements A (generally in hydrated form) is recovered (3);

then this final suspension is dried (4) in a stove at 80° C. for one hour;

finally, the dried final suspension thus obtained is calcined (5) at a temperature of between 400° C. and 1500° C., preferably 700° to 1200° C., in a stationary furnace. The duration of the calcination is between 30 minutes and 4 hours, preferably 30 minutes to 1 hour 30 minutes.

C° CHARACTERISATION OF THE ZINC ALUMINATE CRYSTALS $ZnAl_2O_4$ OBTAINED

The zinc aluminate crystals $ZnAl_2O_4$ were synthesised in accordance with the general procedure mentioned above, with an initial suspension containing 150 g of reagents $(ZnO+Al(OH)_3$ Sigma Aldrich) per litre of solvent (water), with a single pass in the mill at a rate of 30 l/h. Calcination was carried out at 650° C. for 1 hour.

Figure 3:
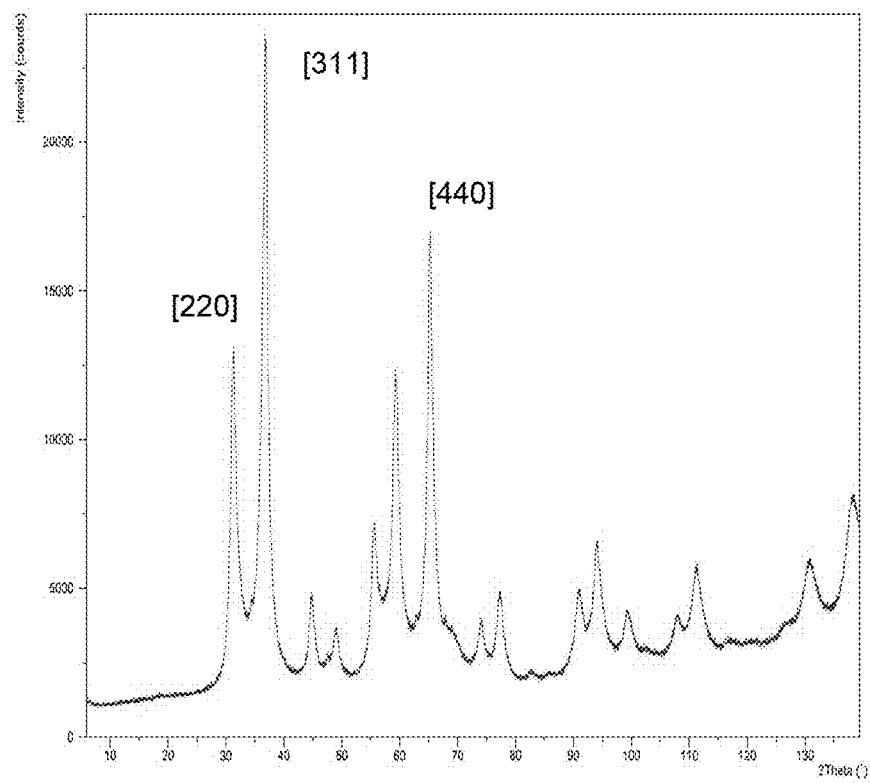
FIG. 3 is an X-ray diffractometry (XRD) spectrum of zinc aluminate crystals obtained according to the method of the invention using the following parameters: starting suspension comprising 150 g/l of raw materials $Al(OH)_3$ from Sigma Aldrich+ZnO, a passage rate of the starting suspension in the mill of 30 l/h, a bead diameter of 500 μm and a calcination temperature of 650° C. for 1 hour.

Referring to FIG. 3, it can be seen that the lines of the XRD spectrum obtained for the zinc aluminate are in accordance with those of the reference spectrum of $ZnAl_2O_4$, known to persons skilled in the art (in accordance with JCPDS 04-007-6610), both for their angular positions and for their relative intensities.

Thus:
the presence of three main peaks is noted (crystallographic planes [220], [311] and [440]), at respectively 31.253°/36.825° and 65.194°,
all the other significant peaks are present at the expected angles, such as 55.621°/59.320°/94.025°; with substantially the expected intensities.

The XRD spectrum also shows that the sample analysed has excellent purity. This is because no contamination is noted:
the principal ZnO peaks (in accordance with JCPDS 04-003-2106), which are at 31.766°/34.419°/36.251°/56.591°, are very small;
the principal alpha phase $Al_2O_3$ peaks (in accordance with JCPDS 04-004-2852), which are at 35.144°/43.343°/57.488°, do not appear therein;
the principal $Al(OH)_3$ peaks (in accordance with JCPDS 04-011-1369), which are at 18.267°/20.258°/37.612°, also do not appear therein.

In conclusion, the method according to the invention makes it possible to easily obtain crystals of zinc aluminate $ZnAl_2O_4$ that are pure, in particular from gibbsite $Al(OH)_3$ and ZnO.

D° CHARACTERISATION OF THE MAGNESIUM ALUMINATE $MgAl_2O_4$ CRYSTALS OBTAINED

The general procedure mentioned above was used to obtain the magnesium aluminate $MgAl_2O_4$ crystals. The initial suspension contains 150 g of reagents $(MgO+Al_2O_3)$ per litre of solvent (water). A single pass through the mill at a rate of 30 l/h was carried out. The calcination was carried out at 1200° C. for 1 hour.

Figure 4:
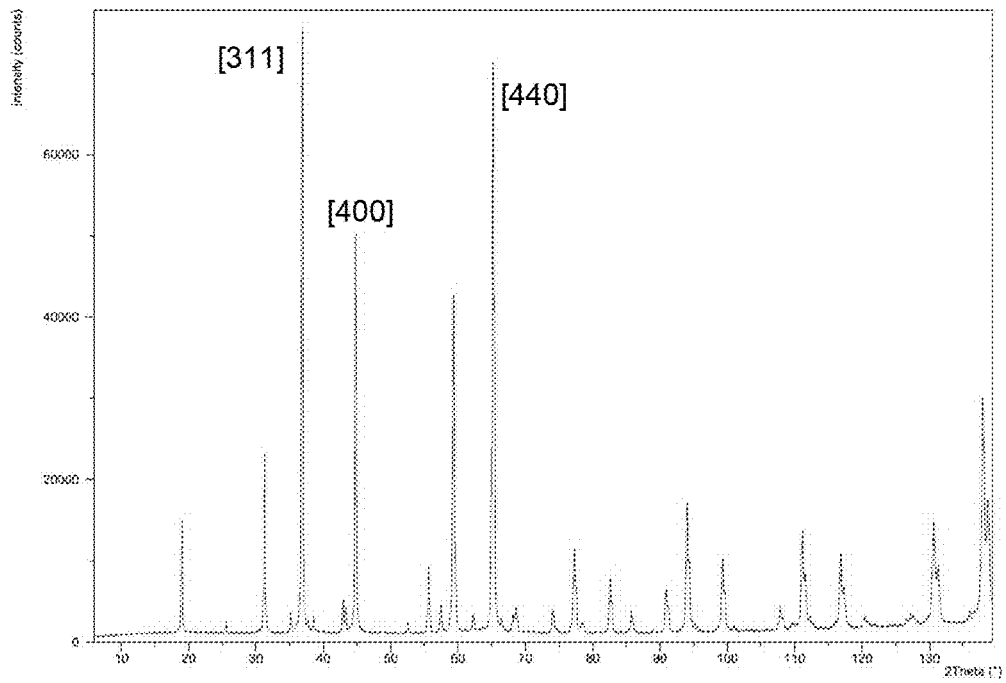
FIG. 4 is an X-ray diffractometry (XRD) spectrum of magnesium aluminate crystals obtained according to the method of the invention using the following parameters: starting suspension comprising 150 g/l of raw materials MgO+alpha phase $Al_2O_3$, a rate of passage of the starting suspension in the mill of 30 l/h, a bead diameter of 500 μm and a calcination temperature of 1200° C. for 1 hour.

Relying on the results presented in FIG. 4, it is found that the lines of the XRD spectrum obtained for the magnesium aluminate are in accordance with those of the reference $MgAl_2O_4$ spectrum, known to persons skilled in the art (in accordance with JCPDS 04-007-2712), both for their angular positions and for their relative intensities.

Thus:
the presence of three main peaks is noted (crystallographic planes [311], [400] and [440]), at respectively 36.837°/44.798° and 65.216°,
all the other significant peaks are present at the expected angles, such as 18.995°/31.363°/59.340°; with substantially the expected intensities.

The XRD spectrum also shows that the sample analysed has excellent purity. This is because no contamination is noted:
the principal MgO peaks (in accordance with JCPDS 04-010-4039), which are at 42.888°/62.266° are very small;
the principal alpha phase $Al_2O_3$ peaks (in accordance with JCPDS 04-004-2852), which are at 35.144°/43.343°/57.488°, are also very small;
the principal $Al(OH)_3$ peaks (in accordance with JCPDS 04-011-1369), which are at 18.267°/20.258°/37.612°, do not appear therein.

In conclusion, the method of the invention makes it possible to easily obtain magnesium aluminate crystals of very good purity, in particular from alpha alumina and MgO. The Applicant also carried out this test at a lower calcination temperature (around 1050° C.), which led to the obtaining of magnesium aluminate with a slightly lower purity for the same calcination time.

E° CHARACTERISATION OF CALCIUM ALUMINATE $CaAl_4O_7$ CRYSTALS

The calcium aluminate crystals were synthesised in accordance with the general procedure mentioned above, with initial suspensions containing 150 g of reagents $(CaCO_3+Al(OH)_3$ Sigma Aldrich) per litre of solvent (water). The molar ratio (Al): (Ca) was fixed at 4. A single pass in the mill at a rate of 30 l/h was carried out. The calcination was carried out at 1050° C. for one hour.

Figure 5:
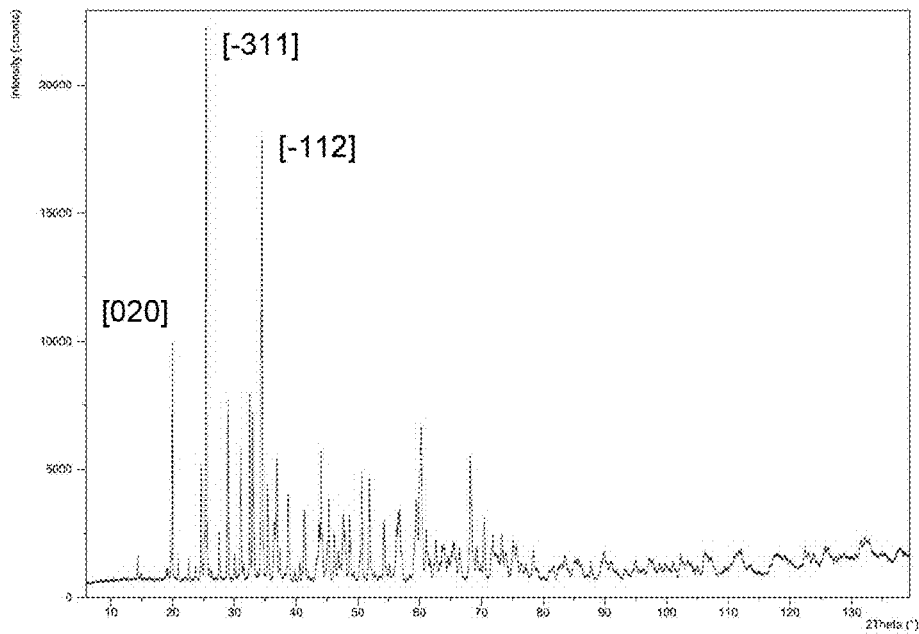
FIG. 5 is an X-ray diffractometry (XRD) spectrum of calcium aluminate crystals obtained according to the method of the invention using the following parameters: starting suspension comprising 150 g/l of raw materials $Al(OH)_3$ Sigma Aldrich+$CaCO_3$, a rate of passage of the starting suspension in the mill of 30 l/h, a bead diameter of 500 μm and a calcination temperature of 1050° C. for 1 hour.

Referring to FIG. 5, it can be seen that the lines of the XRD spectrum obtained for calcium aluminate $CaAl_4O_7$ are in accordance with those of the reference $CaAl_4O_7$ spectrum, known to persons skilled in the art (in accordance with JCPDS 04-007-8974), both for their angular positions and for their relative intensities.

Thus:
the presence of three main peaks is noted (crystallographic planes [020], [311] and [112]), at respectively 20.021°/25.506° and 34.613°;
all the other significant peaks are present at the expected angles, such as 29.038°/32.572°/33.070°/34.477°; with substantially the expected intensities.

The XRD spectrum also shows that the sample analysed has excellent purity. This is because:
the principal CaO peaks (in accordance with JCPDS 00-037-1497), which are at 32.203°/37.346°/53.854°, are not visible;
the principal alpha phase $Al_2O_3$ peaks (in accordance with JCPDS 04-004-2852), which are at 35.144°/43.343°/57.488°, are also not visible;
the principal $Al(OH)_3$ peaks (in accordance with JCPDS 04-011-1369), which are at 18.267°/20.258°/37.612°, do not appear therein;
the principal $CaCO_3$ peaks (in accordance with JCPDS 00-005-0586), which are at 29.405°/39.401°/43.145°, also do not appear therein.

In conclusion, the method of the invention makes it possible to easily obtain calcium aluminates $CaAl_4O_7$ crystals that are pure, in particular from a carbonate as the source of the element calcium.

F° CHARACTERISATION OF BARIUM ALUMINATE $BaAl_2O_4$ CRYSTALS

The barium aluminate $BaAl_2O_4$ crystals were synthesised in accordance with the general procedure mentioned above, with an initial suspension containing 300 g of reagents (($BaO_2$+Al(OH)$_3$ SH300) per litre of solvent (water). Two passes in the mill, at a rate of 30 l/h, were carried out. The calcination was carried out at 1050° C. for 1 hour.

Figure 6:
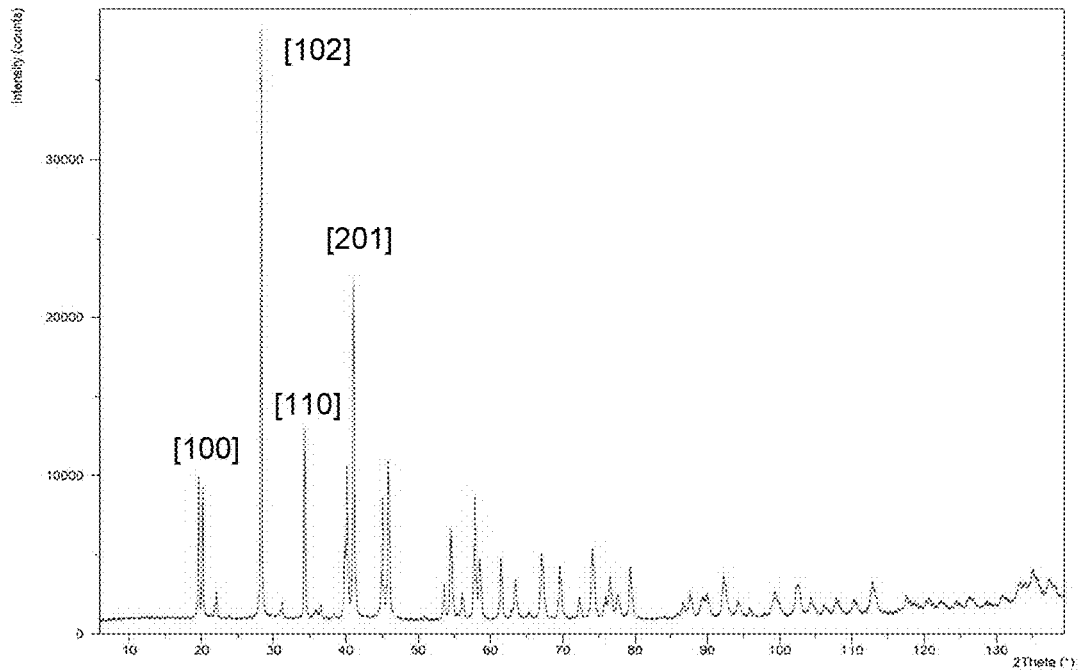
FIG. 6 is an X-ray diffractometry (XRD) spectrum of barium aluminate crystals obtained according to the method of the invention using the following parameters: starting suspension comprising 300 g/l of raw materials $Al(OH)_3$ Sigma Aldrich+$BaO_2$, a rate of passage of the starting suspension in the mill of 30 l/h, a bead diameter of 500 μm and a calcination temperature of 1050° C. for 1 hour.

Referring to FIG. 6, it can be seen that the lines of the XRD spectrum obtained for barium aluminate are in accordance with those of the reference $BaAl_2O_4$ spectrum, known to persons skilled in the art (in accordance with JCPDS 04-010-3758), both for their angular positions and for their relative intensities.

Thus:
- the presence of three main peaks is noted (crystallographic planes [100], [102] and [110]), at respectively 19.595°/28.259° and 34.283°,
- all the other significant peaks are present at the expected angles, such as 40.093°/45.001°/57.578°; with substantially the expected intensities. A probable favourable crystalline orientation along the plane [201] will be noted, which results in a marked peak at 41,146°.

The XRD spectrum also shows that the sample analysed has excellent purity. This is because no contamination is noted:
- the principal $BaO_2$ peaks (in accordance with JCPDS 04-008-6535) which are at 26.044°/26.787°/33.264°, are not visible;
- the principal alpha phase $Al_2O_3$ peaks (in accordance with JCPDS 04-004-2852), which are at 35.144°/43.343°/57.488°, do not appear therein;
- the principal Al(OH)$_3$ peaks (in accordance with JCPDS 04-011-1369), which are at 18.267°/20.258°/37.612°, also do not appear therein.

In conclusion, the method of the invention makes it possible to easily obtain pure crystals of barium aluminate $BaAl_2O_4$, using gibbsite Al(OH)$_3$ SH300, produced on an industrial scale, and a peroxide as the source of the element barium.

G° CHARACTERISATION OF HYDRATED STRONTIUM ALUMINATE $Sr_3Al_2(OH)_{12}$ CRYSTALS AND STRONTIUM ALUMINATE $SrAl_2O_4$ CRYSTALS

The hydrated strontium aluminate $Sr_3Al_2(OH)_{12}$ crystals were synthesised by implementing steps (1) to (4) of the general procedure mentioned above. Thus the calcination step (5) was not carried out initially.

This is because, in some cases, it is not necessary to calcine the suspension of aluminate of the element or elements A obtained at the outlet of the mill in order to obtain crystals. Without being bound by a theory, it appears that, when the aluminium source is a hydroxide and the source of the element A is a hydroxide or a carbonate (partially soluble in water and having a basic character), then a hydrated aluminate is obtained by acid-base reaction.

The synthesis was carried out with an initial suspension containing 300 g of reagents (Al(OH)$_3$ Sigma Aldrich+Sr(OH)$_2$-8H$_2$O) per litre of solvent (water). Two consecutive passes in the mill at a rate of 30 l/h were carried out.

Figure 7:
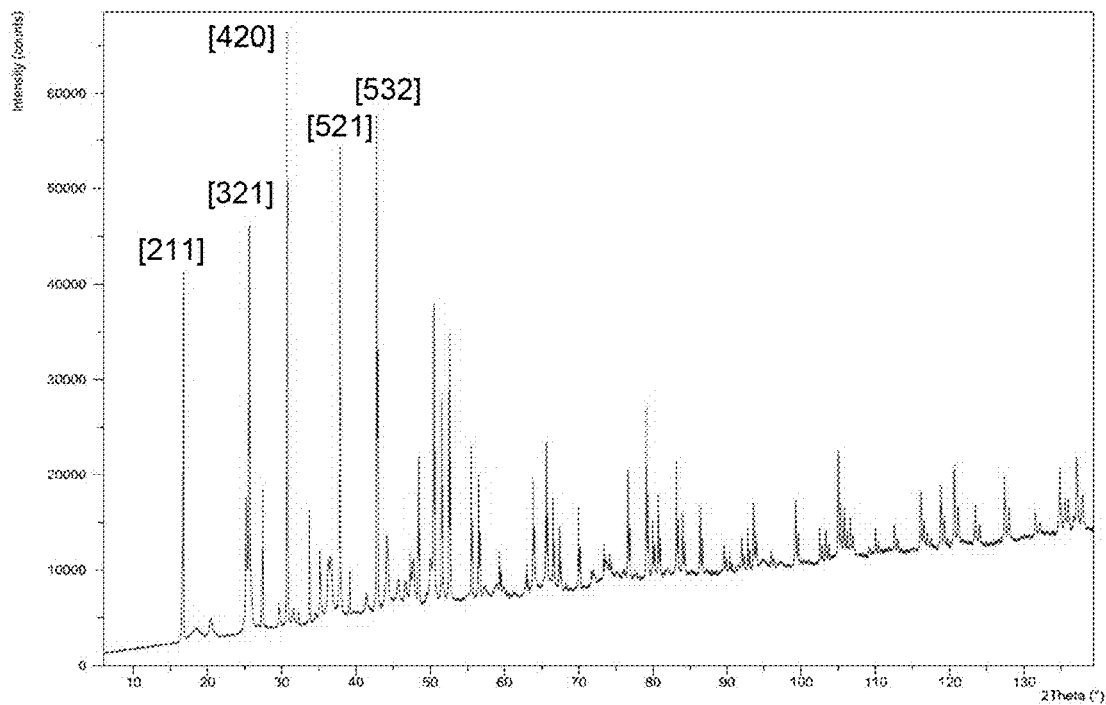
FIG. 7 is an X-ray diffractometry (XRD) spectrum of strontium aluminate crystals obtained according to the method of the invention using the following parameters: starting suspension comprising 300 g/l of raw materials $Al(OH)_3$ SH300+$Sr(OH)_2$-$8H_2O$, a rate of passage of the starting suspension in the mill of 30 l/h and a bead diameter of 500 μm.

Referring to FIG. 7, it can be seen that the lines of the XRD spectrum obtained for hydrated strontium aluminium are in accordance with those of the reference $Sr_3Al_2(OH)_{12}$ spectrum, known to persons skilled in the art (in accordance with JCPDS 04-013-3065), both for their angular positions and for their relative intensities.

Thus:
- the presence of three main peaks is noted (crystallographic planes [211], [321], [420], [521] and [532]), at respectively 16.651°/25.556°/30.657°/37.782° and 42.740°,
- all the other significant peaks are present at the expected angles, such as 50.461°/51.492°/52.508°; with substantially the expected intensities.

The XRD spectrum also shows that the sample analysed has good purity. This is because:
- the principal $SrCO_3$ peaks (in accordance with JCPDS 04-013-9700), which are at 25.341°/25.536°/44.430°, are small;
- the principal Sr(OH)$_2$-8 H$_2$O peaks (in accordance with JCPDS 00-027-0847), which are at 17.071°/28.494°/46.611°, do not appear therein;
- the principal Al(OH)$_3$ peaks (in accordance with JCPDS 04-011-1369), which are at 18.267°/20.258°/37.612°, also do not appear therein.

Secondly, a calcination at 950° C. for one hour, as described in step (5) of the general procedure, was carried out on the hydrated strontium aluminate crystals obtained above.

Referring to FIG. 8, it can be seen that the lines of the XRD spectrum obtained for calcined strontium aluminate are in accordance with those of the reference $SrAl_2O_4$ spectrum, known to persons skilled in the art (in accordance with JCPDS 04-013-0780), both for their angular positions and for their relative intensities.

Thus:
- the presence of three main peaks is noted (crystallographic planes [−211], [220], and [031]), at respectively 28.400°/29.286°, 29.930° and 35.111°,
- all the other significant peaks are present at the expected angles, such as 19.953°/20.111° and 42.891°; with substantially the expected intensities.

The XRD spectrum also shows that the sample analysed has good purity. This is because:
- the principal $SrCO_3$ peaks (in accordance with JCPDS 04-013-9700), which are at 25.341°/25.536°/44.430°, are small;
- the principal SrO peaks (in accordance with JCPDS 00-006-0520), which are at 29.961°/34.729°/49.932°, do not appear therein;
- the principal alpha phase $Al_2O_3$ peaks (in accordance with JCPDS 04-004-2852), which are at 35.144°/43.343°/57.488°, also do not appear therein.

In conclusion, the method of the invention makes it possible to easily obtain crystals of hydrated strontium aluminate $Sr_3Al_2(OH)_{12}$, without including step (5) of the general procedure. Equally, calcination of the hydrated aluminate makes it possible to obtain strontium aluminate crystals $SrAl_2O_4$. It should be noted that the formation of the strontium aluminate is not a step necessary to the obtaining of strontium aluminate crystals. Thus, in a similar manner to the previous examples, it is in particular possible to propose the use of strontium carbonate associated with Al(OH)$_3$ for synthesising said compound.

H° CONCLUSION

Thus it has been demonstrated, after checking by XRD analysis, that various aluminates have been synthesized by means of the method of the invention (all the XRD spectra produced by the Applicant show an entire transformation of the starting compounds). It has been shown that several sources of the element aluminium and of the element A can be used in the method of the invention.

Furthermore, the laboratory mill makes it possible for example to produce 54 kg/h of crystals of various aluminates. This figure could be multiplied by 10 with the addition of an accelerating accessory. Equally, there exist industrial versions of the mill using for example up to 100 kg of beads. With this type of mill, it would consequently be possible to manufacture several tonnes per hour of the various aluminates.

The invention claimed is:

1. A method for manufacturing crystals of aluminate of one or more elements other than the element aluminum, the one or more other elements being independently chosen from one of a metal, a metalloid, or a lanthanide, said method comprising at least the following steps:
   (1) putting in suspension starting reagents comprising at least: a source of the element aluminum and a source of said one or more other elements that has a degree of oxidation ranging from 1 to 6, in a liquid medium, to form a starting suspension, the starting reagents having a mass concentration between 10 g/l and 1000 g/l;
   (2) milling said starting suspension at an ambient temperature of less than or equal to 50° C., in a three-dimensional liquid-phase microbead mill for a holding time of equal to or less than 5 min;
   (3) recovering, at a discharge of said three-dimensional microbead mill, a final suspension comprising said starting reagents in activated form or crystals of aluminate of said one or more other elements;
   (4) optionally, drying or shaping a concentrate of the final suspension obtained at the end of step (3), to obtain a powder or a concentrate comprising, respectively, said starting reagents in activated form or said crystals, of aluminate of said one or more other elements; and
   (5) calcinating said final suspension obtained at the end of step (3) when the final suspension comprises said starting reagents in activated form, or calcinating the powder or concentrate obtained at the end of step (4) when the final suspension comprises said starting reagents in activated form, to obtain crystals of aluminate of said one or more other elements.

2. The method according to claim 1, wherein the mass concentration of the starting reagents is between 50 g/l and 800 g/l.

3. The method according to claim 2, wherein the mass concentration of the starting reagents is between 100 g/l and 600 g/l.

4. The method according to claim 1, wherein the starting suspension has a holding time in the three-dimensional liquid-phase microbead mill less than or equal to 1 minute.

5. The method according to claim 4, wherein the starting suspension has a holding time in the three-dimensional liquid-phase microbead mill from 5 to 25 seconds.

6. The method according to claim 5, wherein the starting suspension has a holding time in the three-dimensional liquid-phase microbead mill ranging from 10 to 20 seconds.

7. The method according to claim 1, wherein one or more of: (i) the crystals of aluminate of said one or more other elements at step (2) are in hydrated form, and (ii) the crystals of aluminate of said one or more other elements at step (3) are in hydrated form.

8. The method according to claim 7, further comprising one of:
   calcinating said final suspension obtained at the end of step (3) when the final suspension comprises said crystals of aluminate of said one or more other elements in hydrated form, and
   calcinating the powder or the concentrate obtained at the end of step (4) when the final suspension comprises said crystals of aluminate of said one or more other elements in hydrated form,
   to obtain non-hydrated crystals of aluminate of said one or more other elements.

9. The method according to claim 1, wherein the calcinating is performed at a temperature of between 400° C. and 1700° C. for a period ranging from 15 minutes to 3 hours.

10. The method according to claim 1, wherein the source of aluminum and the source of said one or more other elements are mixed in the starting suspension in stoichiometric proportions.

11. The method according to claim 1, wherein the source of the element aluminum is chosen from one or more of the following compounds: gibbsite ($Al((OH)_3)$), boehmite $AlO(OH)$, alumina ($Al_2O_3$), one of the precursors thereof or one of the mixtures thereof.

12. The method according to claim 1, wherein the source of said one or more other elements is an oxide, a dioxide, a peroxide, a hydroxide, a di- or tri-hydroxide, an oxide hydroxide, a carbonate, or one of the precursors thereof.

13. The method according to claim 1, wherein said one or more other elements are chosen from one or more of:
   alkaline metals: lithium (Li), sodium (Na), potassium (K), rubidium (Rb) or caesium (Cs),
   the following alkaline earth metals: beryllium (Be), magnesium (Mg), calcium (Ca), strontium (Sr) or barium (Ba),
   the following transition metals: titanium (Ti), chromium (Cr), manganese (Mn), iron (Fe), cobalt (Co), nickel (Ni), copper (Cu), zinc (Zn), yttrium (Y), zirconium (Zr), niobium (Nb), molybdenum (Mo), cadmium (Cd), hafnium (Hf) or tantalum (Ta),
   the following post-transition metals: gallium (Ga), indium (In), tin (Sn) and bismuth (Bi),
   the following metalloids: boron (B), silicon (Si), and
   the following lanthanides: lanthanum (La).

14. The method according to claim 1, wherein the source of said one or more other elements is chosen from one or more of:
   $LiOH$, $Li_2CO_3$,
   $NaOH$, $Na_2CO_3$, $Na_2O$,
   $KOH$, $K_2CO_3$,
   $RbOH$, $Rb_2CO_3$,
   $CCs_2O_3$, $Cs(OH)\text{-}yH_2O$,
   $Be(OH)_2$, $BeO$, $Be(CO_3)_2(OH)_2$,
   $MgO$, $Mg(OH)_2$, $MgCO_3$, $C_4Mg_4O_{12}$—$H_2MgO_2\text{-}xH_2O$,
   $CaO$, $CaCO_3$, $Ca(OH)_2$,
   $Sr(OH)_2$, $SrO$, $SrCO_3$, $SrO_2$,
   $BaO$, $BaO_2$, $BaCO_3$, $Ba(OH)_2$,
   $TiO_2$, $TiO_2$, $H_2TiO_3$,
   $CrO_3$, $Cr_2O_3$, $Cr_2(CO_3)_3$, $Cr(OH)_3$,
   $Mn(OH)_2$, $MnCO_3$, $MnO$, $MnO_2$, $Mn_2O_3$, $Mn_3O_4$,
   $Fe_2O_3$, $FeO(OH)$, $Fe(OH)_3$, $FeCO_3$, $Fe_3O_4$,
   $CoO$, $Co_3O_4$, $Co_2O_3$, $CoCO_3$, $Co(OH)_2$,
   $NiO$, $Ni_2O_3$, $Ni(OH)_2$, $NiO(OH)$, $NiCO_3$,
   $Cu(OH)_2$, $CuCO_3$, $CuO$, $Cu_2O$,
   $ZnO$, $ZnO_2$, $Zn(OH)_2$, $ZnCO_3$,
   $Y_2O_3$,
   $Zr(OH)_4$, $Zr(OH)_2CO_3$—$ZrO_2$, $ZrO_2$,
   $Nb_2O_5$, $Nb(OH)_5$, $NbO_2$,
   $MoO_3$, $MoO_2$,
   $Cd(OH)_2$, $CdO$, $CdCO_3$,
   $Ta(OH)_5$, $Ta_2O_5$, Ga(OH)$_3$, Ga$_2$O$_3$,
In(OH)$_3$, In$_2$O$_3$,
Sn(OH)$_2$, SnO$_2$, SnO,
Bi$_2$O$_3$, (BiO)$_2$CO$_3$, Bi(OH)$_3$,
La$_2$O$_3$, La$_2$(CO$_3$)$_3$, La(OH)$_3$,
B$_2$O$_3$,
SiO$_2$, and H$_2$SiO$_3$.

15. The method according to claim 1, wherein the liquid medium is water (H$_2$O).

16. The method according to claim 1, wherein the microbeads are spherical in shape and have a mean diameter ranging from 0.05 mm to 4 mm.

17. The method according to claim 1, wherein the microbeads have a Vickers hardness measured in accordance with EN ISO 6507-1 greater than or equal to 900 HV1.

18. The method according to claim 1, wherein the microbeads have a true density ranging from 2 to 15 g/cm$^3$.

19. The method according to claim 1, wherein the three-dimensional microbead mill comprises at least:

a roughly cylindrically-shaped stationary milling chamber extending along a longitudinal axis XX, said chamber being at least partially filled by said microbeads and comprising:
    at a first end, at least one inlet serving to introduce said starting suspension, and
    at a second end, an outlet comprising a separator configured to discharge only the suspension of crystals formed in said chamber, and
an agitator, disposed in the stationary milling chamber, in the form of a rod elongate along the longitudinal axis XX, said agitator being configured to move the assembly consisting of microbeads and starting suspension.

20. The method according to claim 1, wherein the microbeads represent, by volume, with respect to the total volume of the stationary chamber, 5% to 85%.

21. The method according to claim 1, wherein the mill functions continuously.

* * * * *